United States Patent [19]

Okumura

[11] Patent Number: 5,764,312

[45] Date of Patent: Jun. 9, 1998

[54] PROJECTOR APPARATUS

[75] Inventor: Ryuichi Okumura, Kanagawa, Japan

[73] Assignee: Sony Corporation, Tokyo, Japan

[21] Appl. No.: 755,109

[22] Filed: Nov. 22, 1996

[30] Foreign Application Priority Data

Dec. 8, 1995 [JP] Japan .................. 7-345088

[51] Int. Cl.⁶ .................................. H04N 5/74
[52] U.S. Cl. .................. 348/785; 348/779; 348/781
[58] Field of Search .................. 348/744, 745, 348/748, 749, 750, 776–788, 825–827; 353/100, 101; 313/36, 478; 359/819, 822, 823, 826, 827; H04N 5/655, 5/645, 9/31, 5/74

[56] References Cited

U.S. PATENT DOCUMENTS 5,045,930  9/1991  Hasegawa .................. 353/101
5,422,692  6/1995  Nishiki ..................... 353/69
5,506,629  4/1996  Kawahara et al. ........ 348/776
5,537,167  7/1996  Toide et al. ............... 353/100
5,585,867  12/1996  Ooya ........................ 348/781

Primary Examiner—Michael H. Lee
Attorney, Agent, or Firm—Jay H. Maioli

[57] ABSTRACT

A projector apparatus which assures easier fine and rough adjustment of a swing and tilt angle, includes inclination rings which are formed symmetrically with respect to the center line of the aperture and is provided with at least two or more continuous inclined surfaces of predetermined inclination angle in both sides of the center line on one surface, a ring supporting member for supporting the inclined surfaces of the inclination rings and a ring guide for assisting rotation of the inclination rings wherein the inclination rings are arranged in such a condition that the other surfaces where the inclined surfaces are not formed are provided opposed with each other.

12 Claims, 20 Drawing Sheets

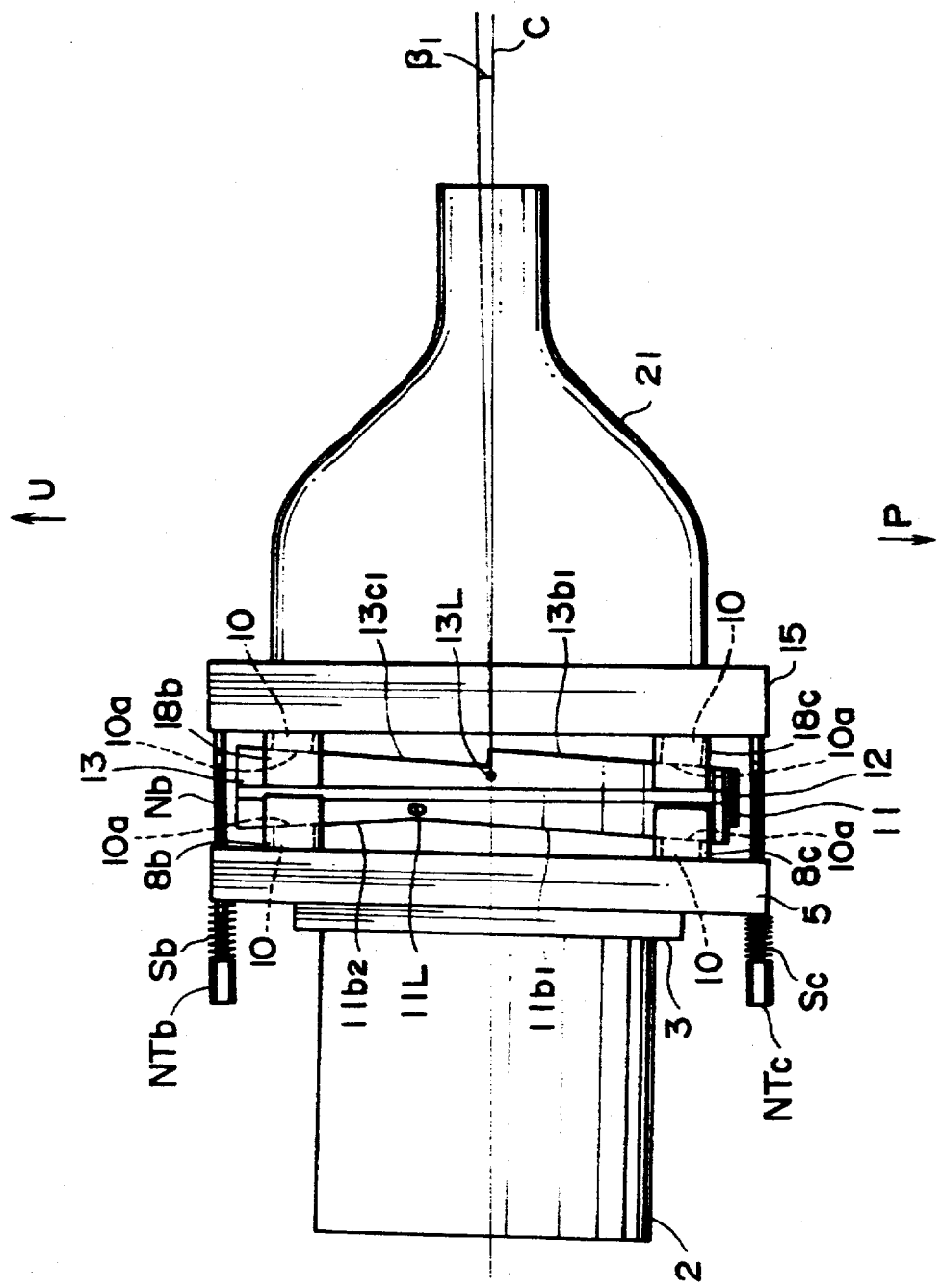

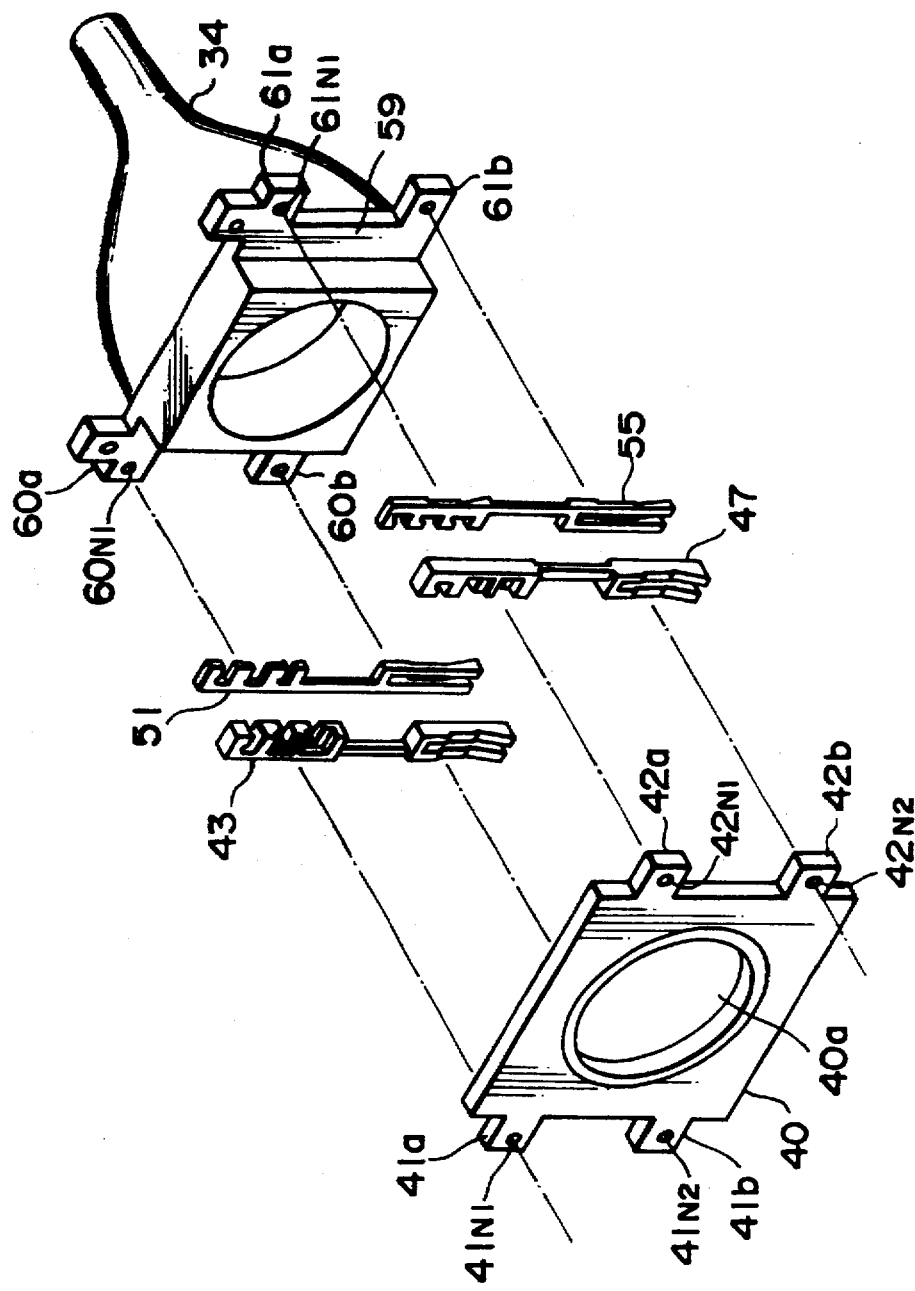

F I G. 19A
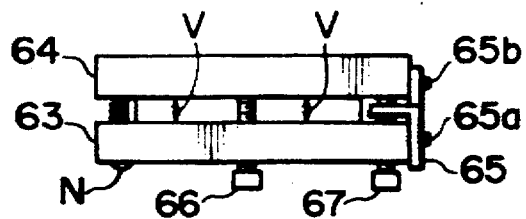
F I G. 19B
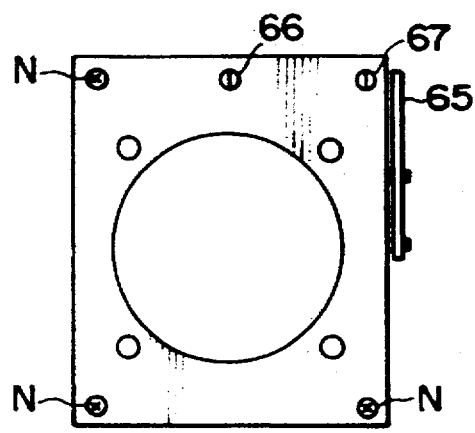
F I G. 19C
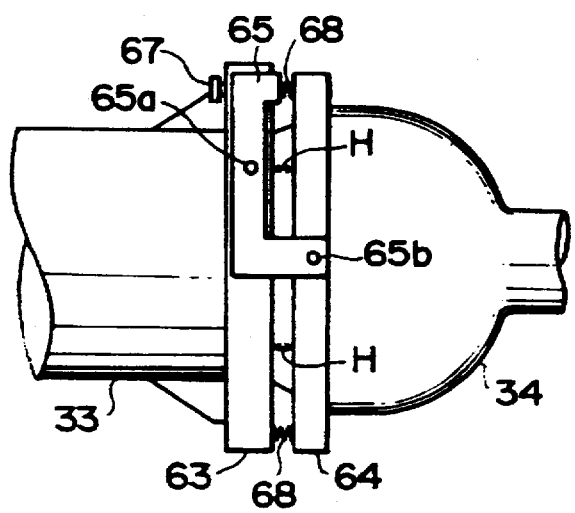
F I G. 19D
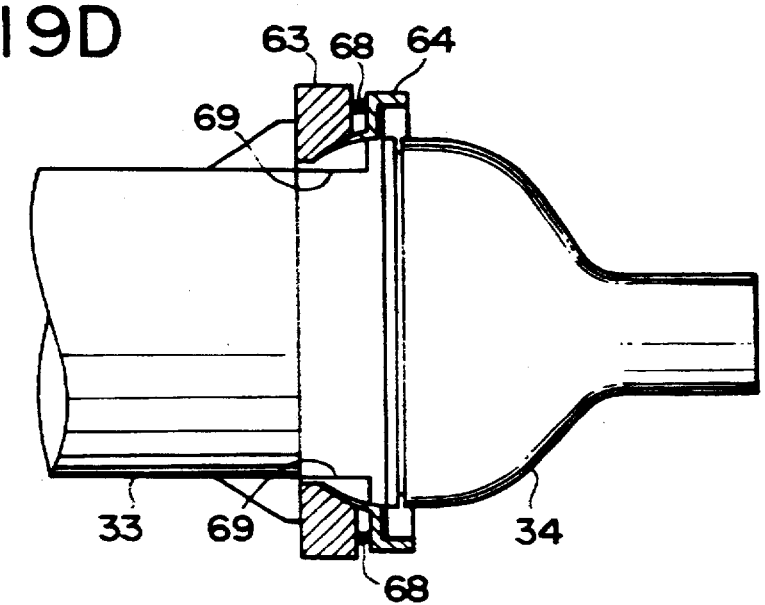

PROJECTOR APPARATUS

BACKGROUND OF THE INVENTION

1. Field of the Invention

The present invention relates to a projector apparatus having an adjusting mechanism for adjusting the elevation angles in the horizontal and vertical directions using a pair of inclined rings.

2. Description of Related Art

A projection type projector apparatus utilizing cathode ray tubes arranges lens blocks to form a focusing optical system in front of three CRTs (Cathode Ray Tubes) corresponding to each color of red (R), green (G) and blue (B) for displaying a combined image on a display screen by projecting magnified images of each color.

FIGS. 14A and 14B are schematic diagrams of an example of such projector apparatus. FIG. 14A is a plan view and FIG. 14B is a side elevation. The lens blocks 33R, 33G, 33B are respectively arranged in front of the CRT 34R, 34G, 34B corresponding to the R beam, G beam and B beam. The light emitted to the screen 35 from each lens block 33 (R, G, B) is indicated by a solid line.

As shown in FIG. 14A, when the lens block 33 (R, G, B) is arranged in parallel for the CRT 34 (R, G, B), the focusing surface FR, FB of the R image and B image projected by the lens blocks 33R, 33B are no longer parallel to the screen 35. In the same way, as shown in FIG. 14B, the focusing surface F (R, G, B) of the lens block 33 (R, G, B) is not parallel to the screen 35 in the vertical direction.

Therefore, as shown in FIGS. 15A and 15B, an image can be displayed in parallel to the screen 35 by providing the predetermined swing and tilt angles θ and β required to the lens block 33 (R, G, B) and CRT 34 (R, G, B), considering the characteristic of the lens (when distance from the light source to lens becomes short, distance between lens and focusing surface, that is, the projection distance becomes longer and the opposite is also true).

FIGS. 16A and 16B schematically show a distance between the light source and lens and a distance between the lens and focusing surface. In this figure, Rs is a light source, L is a lens, F is a focus surface, $a_0$, $a_1$, $a_2$ indicate distances between the light source Rs and lens, and $b_0$, $b_1$, $b_2$ indicate the projection distances.

As indicated in the figure, an image A-B of the light source Rs is inverted at the projecting surface of the lens L and when the light source Rs and the focusing surface F are provided in parallel, an image is indicated as shown in FIG. 16A. While the light source Rs and the focusing surface F are provided with inclination, $1/a_1 + 1/b_1$ and $1/a_2 + 1/b_2$ become constant. Namely, as shown in FIG. 16B, when the distance $a_1$ becomes shorter than the distance $a_0$, the distance $b_1$ becomes longer than the distance $b_0$, when the distance $a_2$ becomes longer than the distance $a_0$, the distance $b_2$ becomes shorter than the distance $b_0$.

Namely, the focus surface F (R, G, B) of the images of colors R, G, B can be displayed in parallel to the screen 35 by respectively giving the horizontal swing angle θ to the lens block 33R and CRT 34R, lens block 33B and CRT 34B as shown in FIG. 15A and giving the vertical tilt angle β to the lens block 33 (R, G, B) and CRT 34 (R, G, B) as shown in FIG. 15B, utilizing the lens characteristic explained above.

If the swing and tilt angles θ and β required as shown in FIGS. 15A and 15B change because when a size of the screen 35 for projection, for example, is changed, a projection distance also changes due to the corresponding change of lens magnification factor.

Therefore, the swing and tilt angles θ and β can be set freely depending on the installation conditions of the projector apparatus with the method explained above.

FIG. 17 is a disassembled perspective view of a projector apparatus including an elevation angle adjusting mechanism of the spacer system to be used for an optical system, for example, of an air coupling type and FIG. 18 is a perspective view showing an enlarged elevation angle adjusting member to be used in this optical system. The swing and tilt angle adjusting mechanism shown in FIG. 17 has a structure that the horizontal swing and vertical tilt angles can be given by arranging and screwing for holding the swing and tilt angles adjusting members 43, 47, 51, 55 between the lens spacer 40 for holding the projection lens and CRT spacer 59 for holding CRT 34 not illustrated in the figure.

At one end portions of the swing and tilt angles adjusting members 43, 47 arranged in the side of the lens spacer 40, the screwing holes 44a, 44b, 44c and screwing holes 48a, 48b, 43c are formed respectively. These screwing holes 44 (a, b, c) and 48 (a, b, c) are formed in different heights corresponding to the inch sizes (70', 120', 250', etc.) of CRT mounted by the CRT spacer 59 for engagement with threaded receptacles 41a, 42a of the lens spacer 40. The focusing distance can be adjusted by selecting the screwing holes 44 (a, b, c) or 48 (a, b, c) for the screw inserted into the screwing holes $41N_1$, $42N_1$ of the threaded receptacles 41a, 42a.

At the other end portions of the swing and tilt angles adjusting member 43, the inclined surfaces 46a, 46c having the inclination angle, for example, of about ±0.2° and flat surface 46b corresponding to the screwing holes 44 (a, b, c) are formed, while at the other end portion of the swing and tilt angles adjusting mechanism 47, the inclined surfaces 50a, 50c and flat surface 50b corresponding to the screwing holes 48 (a, b, c) are formed.

For example, when the threaded receptacle 41a is pressurized in contact with the screwing hole 44a, the inclined surface 46a is placed in contact with the threaded receptacle 41b, while the flat surface 46b is pressurized in contact with the threaded receptacle 41b when the threaded receptacle 41a is engaged with the screwing hole 44b.

In the same manner, when the threaded receptacle 42a is pressurized in contact, for example, with the screwing hole 48a, the inclined surface 50a is placed in contact with the threaded receptacle 42b, while the flat surface 50b is pressurized in contact with the threaded receptacle 42b when the threaded receptacle 42a is engaged with the screwing holes 48b.

The screw N inserted to the threaded receptacles 41b, 42b is also inserted into the inserting portions 46d, 50d formed at the center of the inclined surface and flat surface.

The screws inserted into the screwing holes 44 (a, b, c) and screwing holes (a, b, c) are also screwed into the screwing holes $60N_1$, $61N_1$, of the threaded receptacles 60a, 61a of the CRT spacer via any one of the screwing holes 52 (a, b, c) and screwing holes 56 (a, b, c) of the swing and tilt angles adjusting members 51, 55 arranged in the side of the CRT spacer 59.

At one end portions of the swing and tilt angles adjusting members 51, 55 arranged in the side of the CRT spacer 59, the screwing holes 52a, 52b, 52c and the screwing holes 56a, 56b, 56c are respectively formed. Moreover, in the side opposed to the CRT spacer 59 at this one end portion, the inclined surfaces 53a, 53c, flat surface 53b (not illustrated), inclined surfaces 57a, 57c and flat surface 57b are formed in the periphery of each screwing hole.

In the side opposed to the CRT spacer 59 at the other end portion of the swing and tilt angle adjusting member 51, the inclined surfaces 54a, 54c having inclination angles, for example, of about ±0.2° and flat surface 54b are formed corresponding to the screwing holes 52 (a, b, c), while in the side opposed to the CRT spacer 59 at the other end portion of the swing and tilt angle adjusting mechanism 55, the inclined surfaces 58a, 58c and flat surface 58b are formed corresponding to the screwing holes 56 (a, b, c). Moreover, at the center of these inclined surfaces and flat surface, the inserting portions 54d, 58d are formed and the screw N is screwed into the threaded receptacles 60b, 61b via the inserting portions 54d, 58d.

For example, when the screw N is inserted, for example, into the screwing hole 52a, the inclined surface 53a is placed in contact with the threaded receptacle 60a, while the inclined surface 54a comes in contact with the threaded receptacle 60b. Moreover, when the screw N is inserted into the screwing hole 52b, the flat surface 53b is placed in contact with the threaded receptacle 60a, while the flat surface 54b comes in contact the threaded receptacle 60b.

In the same manner, when the screw N is inserted, for example, into the screwing hole 56a, the inclined surface 57ais placed in contact with the threaded receptacle 61a, comes in contact while the inclined surface 58a with the threaded receptacle 61b. When the screw N is inserted into the screwing hole 56b, the flat surface 57b is placed in contact with the threaded receptacle 61a, while the flat surface 58b comes in contact with the threaded receptacle 61b.

As explained above, selection of the inclined surface using the swing and tilt angles adjusting members 43, 47, 51, 55 having, for example, a plurality of kinds of inclined surfaces is capable of giving swing and tilt angles depending on the inclination angle of the inclined surface.

FIGS. 19A–19D show a swing and tilt angles adjusting mechanism introducing a spherical bearing mechanism. FIG. 19A is a plan view of the swing and tilt angles adjusting mechanism, FIG. 19B shows a front elevation, FIG. 19C shows a side elevation of a projection lens 33 and CRT 34 and FIG. 19D is a cross-sectional view.

As is shown in the cross-sectional view of FIG. 19D, for example, this spherical bearing mechanism constitutes the contact surface of the lens spacer 63 and CRT spacer 64 with a spherical surface and the swing and tilt angles are given bag a degree of tightening of the vertical adjusting screw 66 and horizontal adjusting screw 67 shown in FIGS. 19A, 19B, and 19C. The lens spacer 63 and CRT spacer 64 are coupled with a screw N via a pushing spring 68 and moreover engagement thereof is stabilized with a clamping metal 69 provided at the internal side of the CRT spacer 64.

A vertical adjusting screw 66 is inserted into the lens spacer 63 and is coupled with the CRT spacer 64. When the vertical adjusting screw 66 is tightened (or loosened), the CRT spacer 64 slides along the spherical surface of the CRT spacer 64, causing the vertical interval V in the side of the vertical adjusting screw 66 to become narrower (wider), resulting in an inclination angle, which is called the vertical tilt angle.

A horizontal adjusting screw 67 is inserted into the lens spacer 63 and is coupled with an adjusting lever 65. The adjusting lever 65 is coupled with the lens spacer 63 with a shaft 65a and is also coupled with the CRT spacer 64 with a shaft 56b.

When the horizontal adjusting screw 67 is tightened (loosened), the shaft 65b is pushed defining the shaft 65a as the fulcrum, causing the horizontal interval H in the side of the horizontal adjusting screw 67 to become wider (narrower), resulting in an inclination angle, which is called as the horizontal swing angle.

An adjusting mechanism can be formed concentratedly, for example, on the upper part of the lens spacer 63 by providing the adjusting lever 65 in order to improve operability.

As explained, since the coupling surface between the lens spacer 63 and CRT spacer 64 is formed as the spherical surface, the horizontal swing and vertical tilt angles can be changed freely by sliding these elements on this spherical surface.

FIG. 20 is a perspective view schematically showing a part of the swing and tilt angles adjusting mechanism introducing the 2-axis type mechanism.

A pair of bearing supporting poles 70a, 70a are formed along the optical axis direction at the upper and lower portions of the CRT spacer 70 and the bearing holes 70b, 70b are provided respectively in the front end portions of the bearing supporting poles 70a, 70a.

A bellows 71 is coupled with CRT 34 by fixing the four points in the upper and lower, right and left sides (only two points are illustrated) of the fixing ring 71a with a bolt B 4 for the front surface of the CRT spacer 70, for example.

The horizontal rotating bearing holes 72a, 72a are respectively provided in the upper and lower horizontal frames of the horizontal rotary frame 72 and the vertical rotating bearing holes 72b, 72b are also provided respectively in the right and left sides of the vertical frame. This horizontal rotary frame 72 is located in such a manner as to be sandwiched from the upper and lower sides by the bearing supporting poles 70a, 70b of the CRT spacer 70. Under this condition, the horizontal rotating shafts 73, 73 are inserted respectively to the upper and lower bearing hole 70b and horizontal rotating bearing hole 72a. Thereby, the horizontal rotating frame 72 is held to rotate in the horizontal direction around the horizontal rotating shaft 73 (indicated by the rotating center axis X).

Moreover, a rotating angle adjusting screw $B_1$ inserted by screwing into a screw engaging hole 72c provided at the right side of vertical frame at the upper part of the horizontal rotating frame 72 and the end point of the screw of the rotating angle adjusting screw $B_1$ is placed in contact with the front surface of the CRT spacer 70. Thereby, a rotating angle (horizontal swing angle) of the horizontal rotating frame 72 can be adjusted by rotating the rotating angle adjusting screw $B_1$.

This lens spacer 74 is provided with four bolt engaging holes 74a (three bolt engaging holes are illustrated in the figure) for fixing the lens body not illustrated in the figure and an L-shaped projection 74b (indicated with a cross-sectional view) is formed at almost center of the upper end part and this L-shaped projection 74b is provided with a screw engaging hole 74c of the rotating angle adjusting screw $B_2$. Moreover, the vertical rotating bearing holes 74d, 74d are formed respectively at the center area of the right and left sides.

Moreover, the bellows 71 is mounted, in such a condition as is fixed to the CRT spacer 70 not illustrated, to the rear surface of the lens spacer 74, while the lens element 75 and CRT 34 are coupled. In this case, a liquid having the refractive index which is almost equal to that of glass is supplied into the bellows 71. Thereby, the CRT 34 and lens element 75 are coupled optically, resulting in the effect of cooling the tube surface of the CRT 34.

Since the vertical rotating shafts 76, 76 are respectively inserted into the right and left vertical rotating bearing holes 74d of the lens spacer 74 and vertical rotating bearing hole 72b of the horizontal rotating frame 72, the lens spacer 74 can be held rotatable in the vertical direction around the rotating center shaft Y shown in the figure under the condition it is located within the frame of the horizontal rotating frame 72. Moreover, under this condition, the rotating angle adjusting screw B 2 is inserted by screwing into the screw engaging hole 74c of the L-shaped projection 74b and the end point of the rotating angle adjusting screw $B_2$ is placed in contact with the front surface of the horizontal rotating frame 72.

Thereby, the rotating angle (vertical tilt angle) of the lens spacer 74 can be adjusted by rotating the rotating angle adjusting screw $B_2$.

FIG. 21 shows a s(wing and tilt angle adjusting mechanism for giving a swing and tilt angle with inclination of the inclination rings by arranging two sheets of inclination rings 85, 86 between the lens spacer 82 and CRT spacer 88. In this figure, the inclination rings 85, 86 are partly cut out for illustration, arranging therein the bellows 78. Moreover, at the upper surface of the CRT spacer 88, accumulators 89, 89 are formed to accumulate/release a load which is applied, for example, with the weight of CRT 34 or the like.

The lens spacer 82 and CRT spacer 88 are coupled with the screws N, N through a compressed spring S to keep the stable condition even when a swing and tilt angle is given by the inclination rings 85, 86.

FIGS. 22A–22C schematically show a swing and tilt ring which is given when the inclination rings 85, 86 rotate.

For example, where the inclination ring 85 rotates for 180 degrees from the condition shown in FIG. 22B, the inclination of the inclination ring 85 gives a swing and tilt angle $\theta_1$ as shown in FIG. 22B. In addition, when the inclination ring is rotated, for example, for 180 degrees from the condition shown in FIG. 22A, inclination of the inclination ring 86 gives a swing and tilt angle $\theta_2$ as shown in FIG. 22C.

However, the adjusting mechanism shown in FIG. 17, FIG. 18 is capable of giving a swing and tilt angle with such a simple method as arranging the swing and tilt angle adjusting members 43, 47, 51, 55 between the CRT spacer 59 and lens spacer 40 but can give only the swing and tilt angle previously formed on each angle adjusting member. Therefore when, it is required to give different swing and tilt angles, the swing and tilt angle adjusting member must be exchanged and thereby such exchanging work is considerably complicated.

In addition, in the adjusting mechanism forming the contact surface between the CRT spacer 64 and lens spacer 63 with the spherical surface as shown in FIG. 19, when a press spring 68 is to be arranged between the CRT spacer 64 and lens spacer 63, this press spring 68 must be pressed previously and therefore a specially designed jig is also required for the assembling.

Moreover, it is difficult to detect in which condition the swing and tilt angle is previously set and it is not easy to previously give the preset swing and tilt angle before installation of the projector apparatus.

The gimbal mechanism shown in FIG. 20 is required to provide a higher accuracy to the coupling portions of elements in order to satisfy reliability for transportation and the angle adjusting function. As a result, the manufacturing cost and assembling cost are increased.

Meanwhile, as shown in FIG. 21, the adjusting mechanism utilizing a couple of inclination rings 85, 86 provides a problem that a swing and tilt angle can be detected immediately from a numeral indicated, for example, at the side surface of these inclination rings but highly accurate fine adjustment cannot be realized easily because the swing and tilt angle is not changed within the same plane.

SUMMARY OF THE INVENTION

The present invention has been proposed to overcome the problems explained above and also has the object to provide a projector apparatus comprising a cathode ray tube CRT, a lens block forming a focused. Optical system and a swing and tilt angle adjusting mechanism arranged between the CRT and lens block to give the predetermined swing and tilt angle. The swing and tilt angle adjusting mechanism in the projector apparatus is composed of an inclination ring which is symmetrically formed for the center line of an aperture to have two or more continuous inclined surfaces of the predetermined angle in both sides of the center line of one surface, an inclination ring supporting means for supporting the inclined surface of the inclination ring and a ring guide means for assisting rotation of the inclination ring. Thereby, the projector apparatus of the present invention can adjust a swing and tilt angle by sliding the inclination ring supporting means on he inclined surface of the inclination ring.

Moreover, in the projector apparatus comprising a CRT, a lens block forming an image focusing optical system and a swing and tilt angle adjusting mechanism arranged between the CRT and lens block to give the predetermined swing and tilt angle to the CRT, the swing and tilt angle adjusting mechanism is composed of first and second inclination rings which are symmetrically formed for the center line of an aperture to have two or more continuous inclined surfaces of the predetermined angle in both sides of the center line of one surface, an inclination ring supporting means for supporting the inclined surfaces of the first and second inclination rings and a ring guide means for assisting rotation of the first and second inclination rings. Thereby, the projector apparatus of the present invention is constituted by arranging the first and second inclination rings in such a condition that the other surfaces where the inclined surface is not formed are provided opposed with each other.

According to the present invention, fine adjustment for swing and tilt angle can be realized because the swing and tilt angle can be changed on the same plane by rotating the inclination rings.

Moreover, the coarse adjustment can also be executed because the adjusting condition of the swing and tilt angle can be detected quantitatively from the rotating angle of the inclination rings.

BRIEF DESCRIPTION OF THE DRAWINGS

Other objects and advantages of the present invention will be apparent from the following detailed description of the presently preferred embodiments thereof, which description should be considered in conjunction with the accompanying drawings in which

FIG. 7 is a schematic diagram for giving a vertical tilt angle to a projector apparatus of a preferred embodiment;

FIG. 17 is a diagram for explaining a spacer type swing and tilt angle adjusting mechanism as a related art;

FIGS. 19A–19D are diagrams for explaining a swing and tilt angle adjusting mechanism utilizing a spherical surface bearing as a related art;

DETAILED DESCRIPTION OF PREFERRED EMBODIMENTS

The preferred embodiments of a projector apparatus of the present invention will be explained hereunder with reference to FIG. 1 to FIG. 12.

Figure 1:
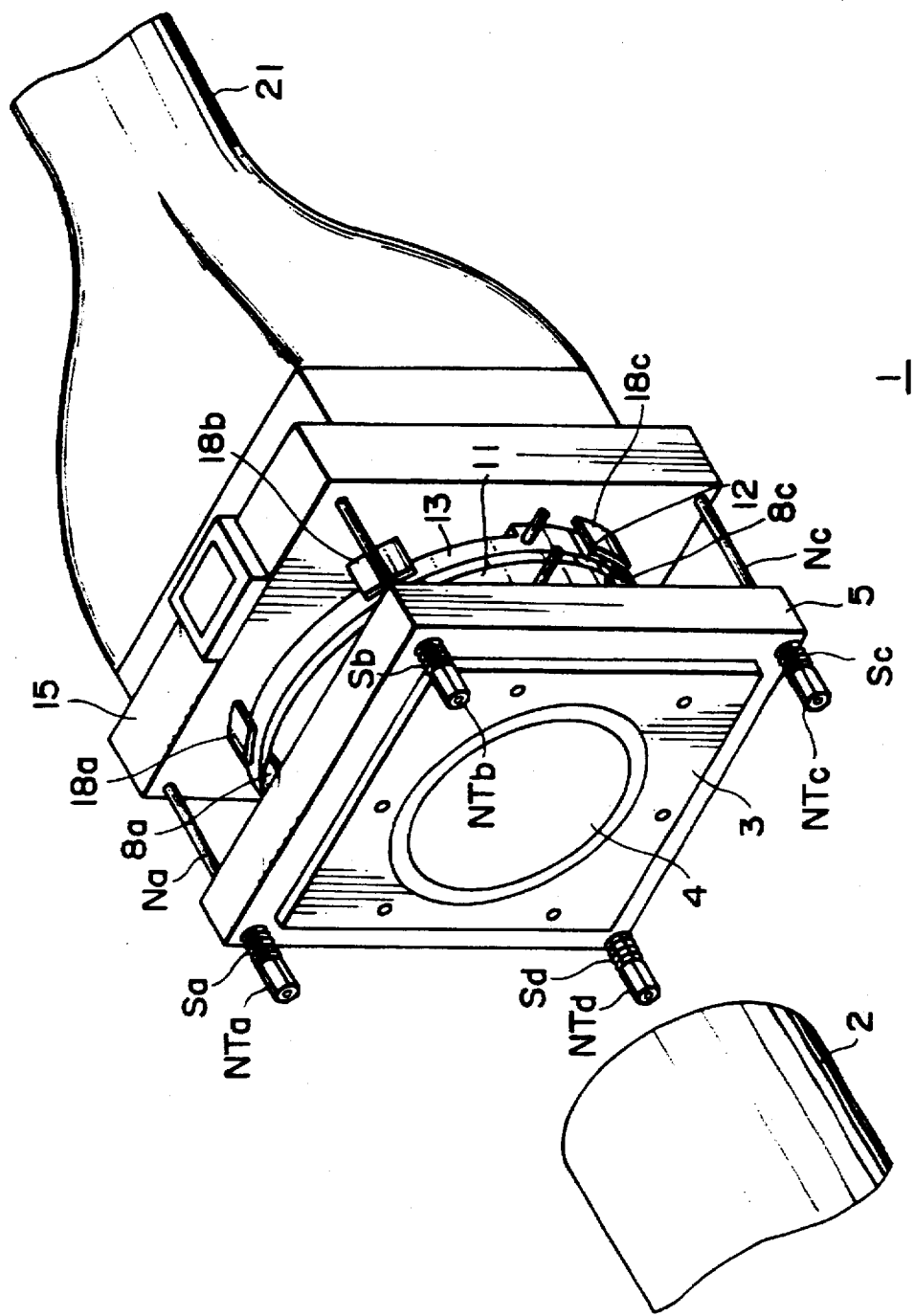
FIG. 1 is an external perspective view of a projector apparatus of a preferred embodiment of the present invention.
Figure 2:
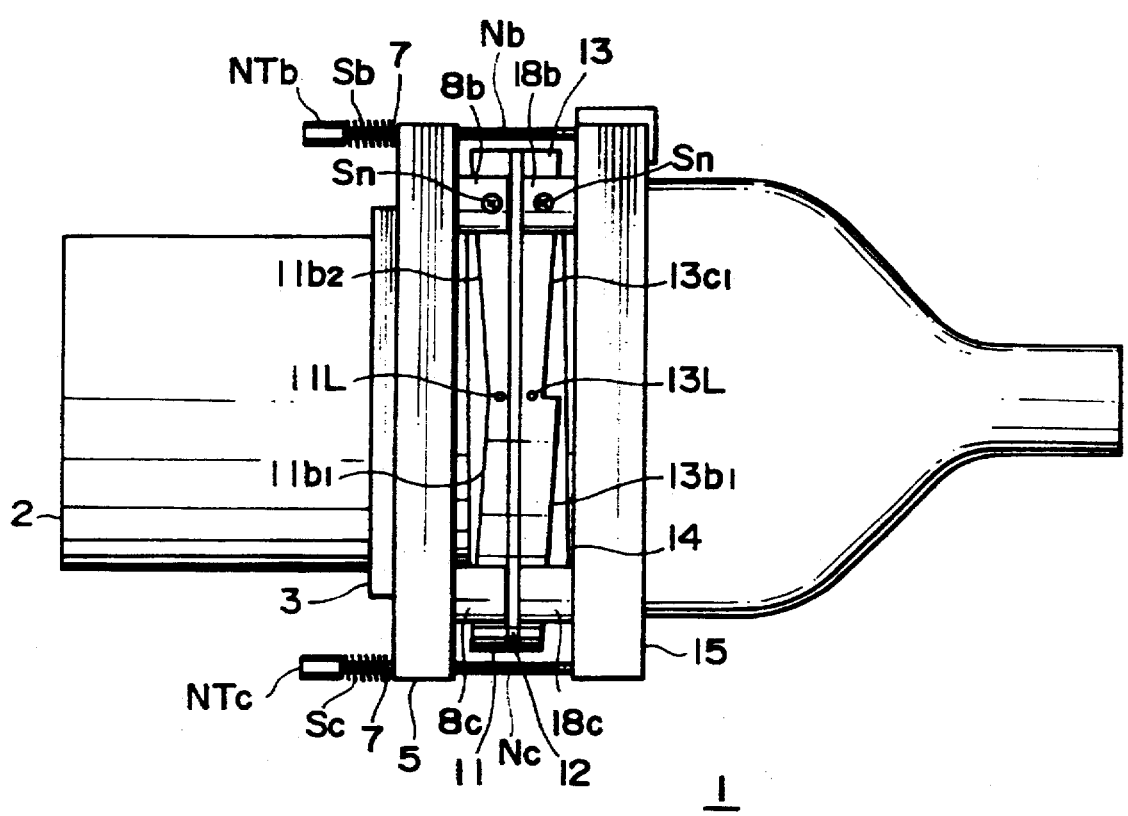
FIG. 2 is a plan view showing a projector apparatus of a preferred embodiment from the side elevation.
Figure 3A:
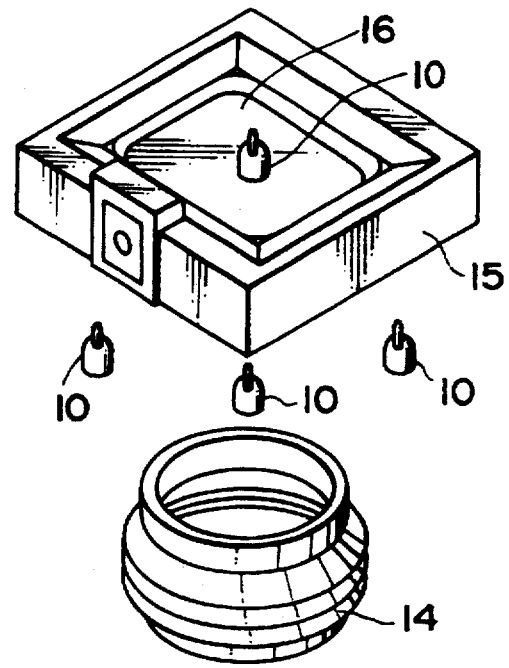
FIGS. 3A–3C are disassembled perspective views showing the essential portion of a projector apparatus of a preferred embodiment.
Figure 3C:
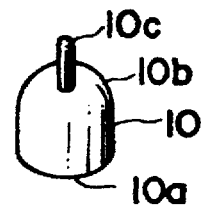
Figure 3B:
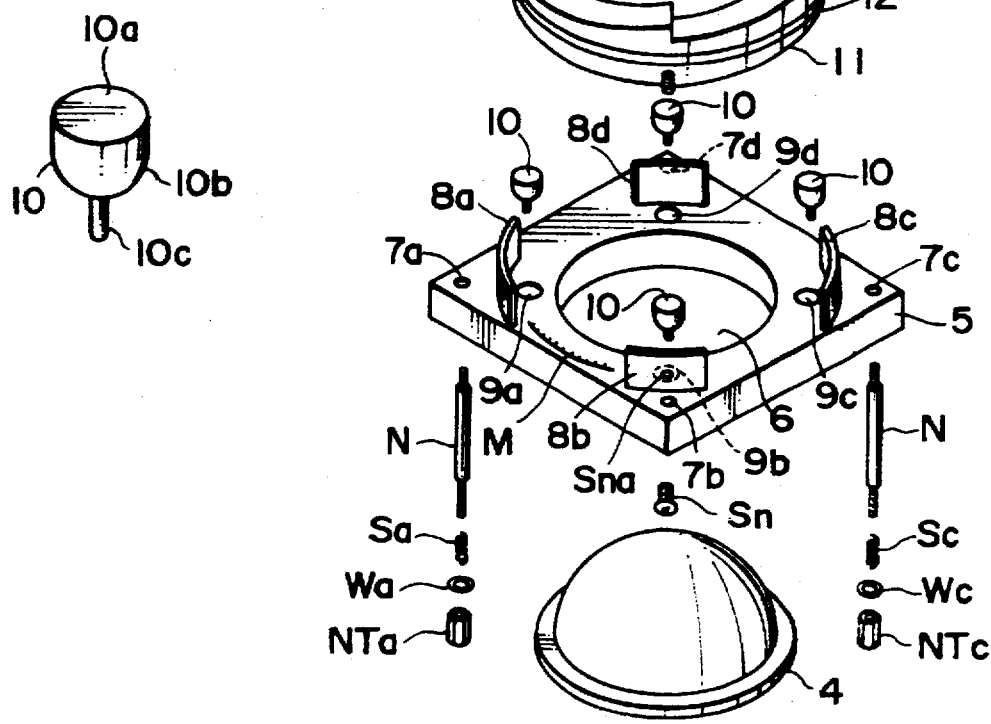

FIG. 1 is a perspective view showing the outlook of the projector apparatus of the preferred embodiment of the present invention. FIG. 2 is a plan view showing the projector apparatus shown in FIG. 1 from the side surface. FIGS. 3A–3C provide a disassembled perspective view showing the essential portion of the projector shown in FIG. 2. First, outline of the structure of the projector apparatus will be explained with reference to FIG. 1 and FIG. 2 and thereafter details of the projector apparatus will then be explained with reference to the disassembled perspective view of FIG. 3. In FIGS. 3A–3C, wherein the lens block and CRT are not illustrated.

As shown in FIG. 1 and FIGS. 3A–3C the swing and tilt angle adjusting mechanism to be used for the projector apparatus of this preferred embodiment is composed of a lens spacer for holding the lens block 2 and a CRT spacer 15 for holding the inclination rings 11, 13. The lens spacer 5 and CRT spacer 15 are coupled with a nut NT, a washer not illustrated, a spring S and a screw member N and an inclination ring 11 for adjusting a vertical tilt angle, an inclination ring 13 for adjusting a horizontal swing angle and a lubricating ring 12 used as a buffer member of the inclination rings 11, 13 are allocated between the lens spacer 5 and CRT spacer 15.

A projection lens 2 for projecting an image on the screen is fixed with a screw or the like to the lens holder 3 provided at the front surface of the lens spacer 5. Moreover, the lens holder 3 is provided with a bowl type lens element 4 mounted therein.

At the four corners of this lens spacer 5, screw holes to which a screw member N (Na–Nd) having formed thereon a threading groove at both ends is inserted are provided and one end of the screw member N inserted into this screw hole is screwed into the CRT spacer 15. Moreover, the other end of the screw member N is projected to the front side of the lens spacer 5 and the nut NT (NTa–NTd) is threaded thereto via a spring S (Sa–Sd) and a washer W (not illustrated). Therefore, when the spring S is pressed, the lens spacer 5 and CRT spacer 15 can be maintained in the stabilized condition.

FIG. 3A is a disassembled perspective view of the essential portion of the projector apparatus 1. FIGS. 3B and 3C are diagrams illustrating the enlarged ring supporting member for supporting the inclination rings 11, 13 shown in FIG. 3A.

At the rear surface of the lens spacer 5, the guide rings 8 (a, b, c, d) for supporting the inclination ring 11 and guiding the rotation thereof are projected. At the internal side of the ring guide 8, the inclination ring 11 is arranged and thereby this inclination ring 11 can execute smooth rotating operation in the latitude direction.

At the internal side of the ring guide 8 (a, b, c, d), the spot facing 9 (a, b, c, d) having the bottom part of the spherical surface is formed as will be explained in detail with reference to the cross-sectional view of FIG. 6 and the ring supporting member 10, 10, 10, 10 is arranged at this spot facing 9.

As is shown in FIG. 3B, the upper surface area 10a of the ring supporting member 10 is formed as the flat surface and is placed in contact with the inclined surface of the inclination ring 11 to support it and the lower area thereof is formed as the spherical surface 10b like the spot facing 9 allowing the end part thereof to be provided with a projection 10c. This projection 10c is inserted into a hole H formed at the bottom part of the spot facing 9 not illustrated in this figure. Thereby, stability of the deviating operation of the ring supporting member 10 depending on the inclination of the inclination ring 11 can be improved.

Moreover, a screw hole Sna to which a stopper screw Sn is inserted to prevent simultaneous rotation of two inclination rings for adjusting a swing and tilt angle is formed to the ring guide 8b. This stopper screw Sn restricts rotation of the inclination ring 11 when the end point thereof is set in contact with the side surface of the inclination ring 11. Here, the screw hole Sna is provided at the ring guide 8b and it may be provided to any one of the ring guide (*a*, *c* or *d*). As explained, only the inclination ring 13 can be rotated by fixing the inclination ring 11 with the stopper screw Sn for rotating the inclination ring 13 to adjust the horizontal swing angle.

The stopper screw mechanism as explained above can also be provided for the inclination ring 13 as will be explained later.

A memory or indicator scale M is provided along the ring guide 8 to show the amount of rotation of the inclination ring 11. The angle indicated by this memory M is indicated by a rotating lever as will be explained later.

Figure 4A:
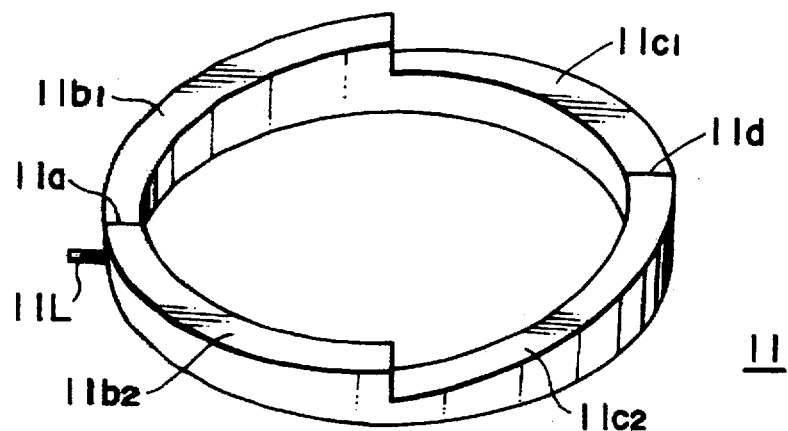
FIGS. 4A–4C are perspective views showing inclination rings and a lubricating ring forming a swing and tilt angle adjusting mechanism of a preferred embodiment.
Figure 4B:
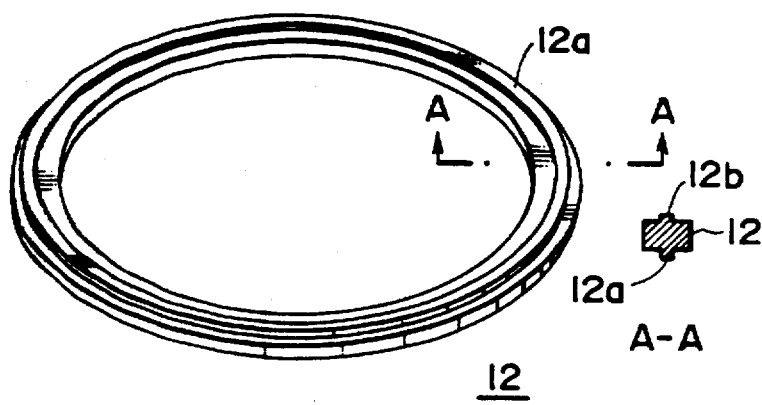
Figure 4C:
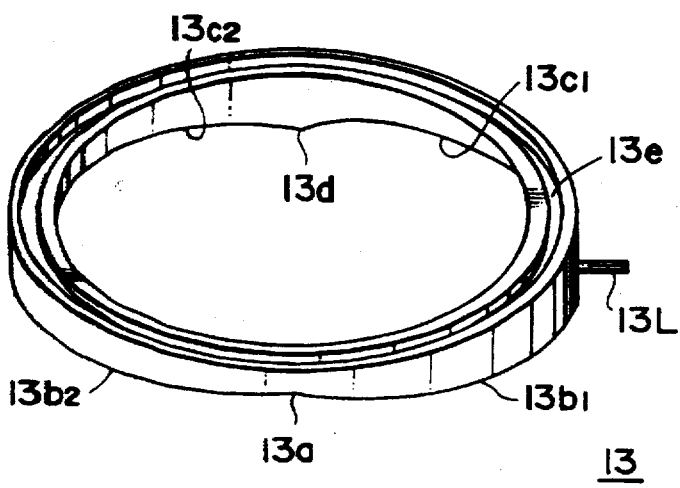

The inclination rings 11, 13 and lubricating ring 12 are enlarged for illustration in the disassembled perspective views of FIGS. 4A, 4B and 4C.

The inclination ring 11 shown in FIG. 4A is symmetrically formed with respect to the line connecting a valley area 11*a* and a mountain top area 11*d* and passing the center of the aperture and includes two kinds of inclined surface $11b_1$, $11b_2$ starting from the valley area 11*a* and $11c_1$, $11c_2$ formed toward the mountain top area 11*d*. The valley area 11*a* is formed in the same level to the other end portions opposed to the mountain top area of the inclined surfaces $11c_1$, $11c_2$, while the top areas of the inclined surfaces $11b_1$, $11b_2$ are formed in the same level as the mountain top area 11*d*. Therefore, each inclined surface is formed in the same gradient and the inclined surfaces $11b_1$, $11c_1$, and inclined surfaces $11b_2$, $11c_2$ are always supported by the ring supporting member 10 at the position in the same height. Moreover, at the opposed surface where each inclined surface is formed, the groove similar to the guide groove 13*e* of the inclination ring 13 which will be explained later in regard to FIG. 4C is also formed.

A rotating lever 11L is projected at the side surface corresponding to the valley area 11*a* and is operated to rotate the inclination ring 11. Moreover, it is also possible to form the rotating ring 11L removable and it may be removed when adjustment for swing and tilt angle is not required.

The lubricating ring 12 shown in FIG. 4B is formed, for example, of a resin material such as polyacethar or the like as a buffer member and is arranged between the inclination rings 11 and 13.

Usually, the lubricating ring 12 also works as a stopper so that the inclination rings 11, 13 do not easily rotate when these are not operated. Moreover, as shown in the cross-sectional view of FIG. 4C, the guide projections 12*a*, 12*b* are projected along the circumference thereof and these are engaged with the guide groove formed at the flat surface provided opposed to the inclined surfaces of the inclination rings 11, 13.

The inclination ring 13 shown in FIG. 4C is formed in the same shape as the inclination ring 13 shown in FIG. 4A. The valley area 13*a*, inclined surfaces $13b_1$, $13b_2$, inclined surfaces $13c_1$, $c_2$, mountain top area 13*d* correspond to the valley area 11*a*, inclined surfaces $11b_1$, $11b_2$ inclined surfaces $11c_1$, $11c_2$, mountain top area 11*d*. In addition, as shown in the figure, the inclination ring 13 is allocated with deviation of 90 degrees with respect to the inclination ring 11. Therefore, the rotating lever 13L is provided at the side surface of the top area of the inclined surface $13b_1$.

That is, under the usual condition not giving the swing and tilt angle, the rotating levers 11L and 13L, inclined surfaces $11b_1$ and $13c_1$, inclined surfaces $11b$, and $13c_2$, inclined surfaces $11c_1$ and $13b_1$, inclined surfaces $11c_2$ and $13b_2$ are arranged opposed with each other.

Thereby, when the inclination rings 11, 13 are rotated, any one of rings becomes higher than the other about the lines connecting the valley area 11*a* and mountain top area 11*d* and connecting the valley area 13*a* and mountain top area 13*d*. Thereby, the inclination ring 11 can provide the vertical tilt angle, while the inclination ring 13 arranged in the condition deviated by 90 degrees from the inclination ring 11 can provide a horizontal swing angle.

In this embodiment, the inclination rings 11, 13 are symmetrically formed, about the valley area and mountain top area passing the center of the aperture and includes two kinds of inclined surfaces, but it is also possible to provide two or more kinds of inclined surfaces. In such a case, the top facing 9 and ring supporting member 10 are provided in accordance with the number of inclined surfaces.

As explained above, a swing and tilt angle can be given to the CRT 21 by rotating the two inclination rings 11, 13 having the predetermined inclined surfaces explained with reference to FIGS. 4A, 4B, and 4C.

Returning to FIG. 3A again, the bellows 15 is inserted for arrangement into the center area of the inclination rings 11, 13 and lubricating ring 12 and one end portions thereof are mounted to the lens spacer 5, while the other end portions to the CRT spacer 15. The liquid having the refractive index similar to that of glass is supplied into the bellows. Thereby, the CRT 21 and lens element 5 can be optically coupled.

This bellows 14 is structured so that the desired area can be compressed or expanded depending on the swing and tilt angle when it is given by the inclination rings 11, 13.

The CRT 21 shown in FIG. 1 and FIG. 2 is mounted from the rear side (upper side in the figure) of the CRT spacer 15 to which the other end of the bellows 14 is mounted. An image beam emitted from the CRT is incident to the lens block 2 via the bellows 14 and lens element 4 after having passed the aperture 16.

Figure 5:
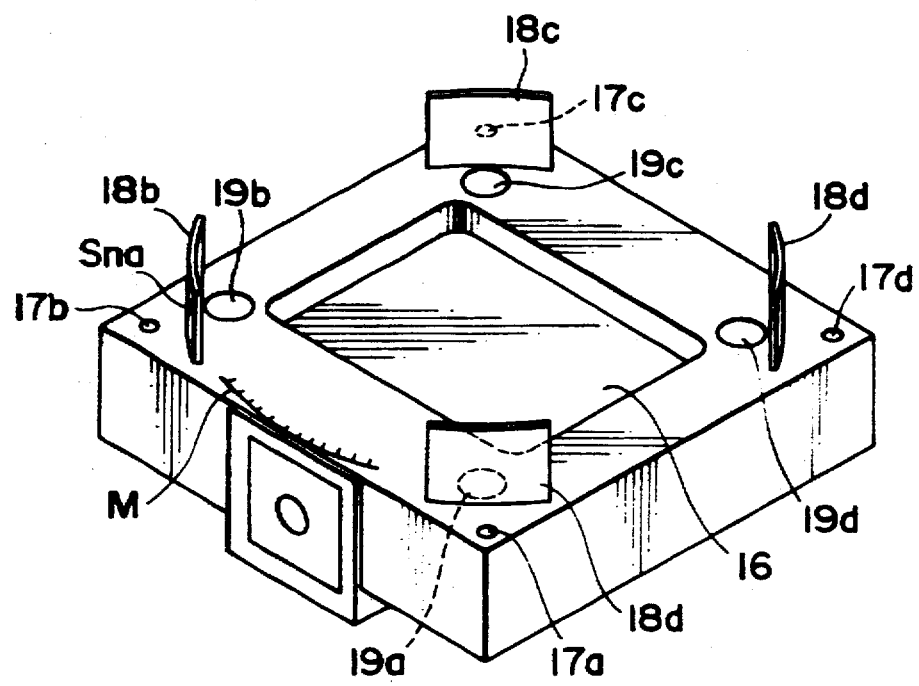
FIG. 5 is a perspective view of a CRT spacer forming a swing and tilt angle adjusting mechanism of a preferred embodiment.

In the front side (lower side of FIG. 3A) of the CRT spacer 15, screw holes 17 (*a*, *b*, *c*, *d*) to which the screw member N having passed the lens spacer 5 is screwed, ring guides 18 (*a*, *b*, *c*, *d*) similar to the lens spacer 5 and spot facings 19 (*a*, *b*, *c*, *d*) are formed as shown in FIG. 5. Moreover, for example, a screw hole Sna to which the stopper screw is screwed is formed to the ring guide 18*b* like the ring guide 8*b* of the lens spacer 5.

In the spot facings 19 (*a*, *b*, *c*, *d*), the ring supporting member 10 of the same shape as that arranged in the spot facings 9 of the lens spacer 5 are also arranged In addition, when the inclination ring 13 is engaged for arrangement with the internal side of the ring guides 18 (*a*, *b*, *c*, *d*), each inclined surface of the inclination ring 13 is respectively supported by the flat area 10*a* of the ring supporting member 10.

Moreover, like the lens spacer 5, a memory M indicating the rotating angle of the inclination ring 13 is also provided.

Next, with reference to the cross-sectional view of FIGS. 6A–6D supporting of the inclination rings 11, 13 with the ring supporting member 10 will then be explained. In regard to this figure, an example of supporting the inclination ring 11 with the ring supporting member 10 will be explained but the inclination ring 13 is also supported by the ring supporting member 10 arranged on the CRT spacer 15.

Figure 6A:
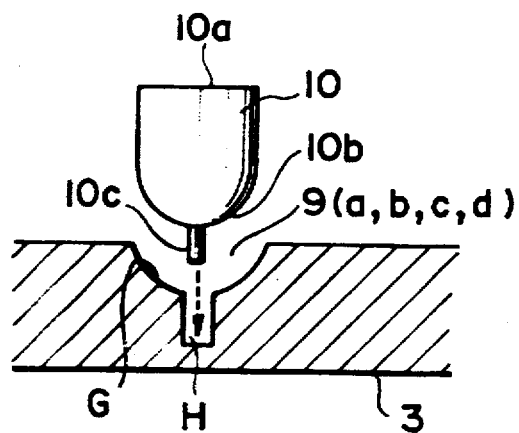
FIGS. 6A–6D is a cross-sectional views of the facings for arranging the ring supporting means and ring supporting means.
Figure 6B:
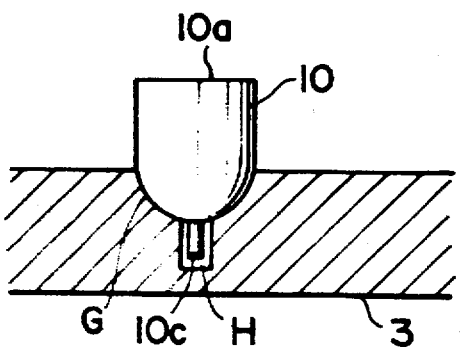

FIG. 6A is a cross-sectional view showing the area near the spot facing 9. The spot facing 9 has the bottom part having the spherical surface and allows at its lowest part the hole H to be formed in the diameter which is a little larger than the diameter of the projection 10*c* of the ring supporting member 10. As shown in FIG. 6B, when the ring supporting member 10 is arranged at the spot facing 9, the projection 10c formed at the end part of the ring supporting member 10 is inserted into the hole H and the spherical part 10b is engaged with the spot facing 9. In this case, as shown in the figure, since the projection 10b provides a small playing area in the hole H and the spherical surfaces are placed in contact with each other, when any inclined surface of the inclination ring 11 (13) is placed in contact with the flat surface 10a, deviation depends on the inclination angle of the inclined surface as shown in FIGS. 6A, 6C, and 6D.

Figure 6C:
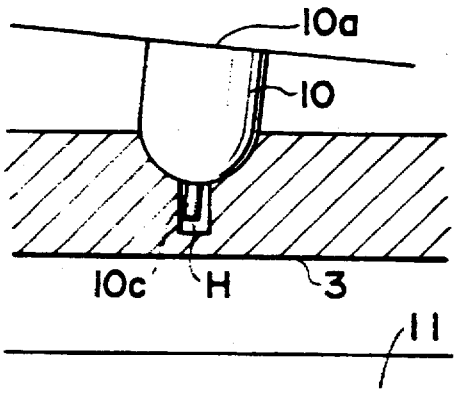

For example, as shown in FIG. 6C, when the inclined surface of the inclination ring 11 (13) is inclined in the right side, the ring supporting member 10 is also inclined in the right side depending on the inclination of the ring surface. Thereby, the projection 10c deviates in the left side in the hole H. The center of deviation of the ring supporting member 10 is defined by inserting the projection 10c into the hole H as explained above to stably support the ring.

Figure 6D:
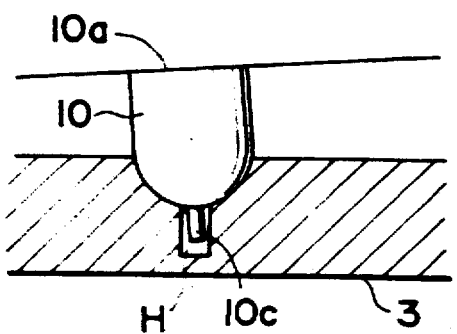
Figure 8:
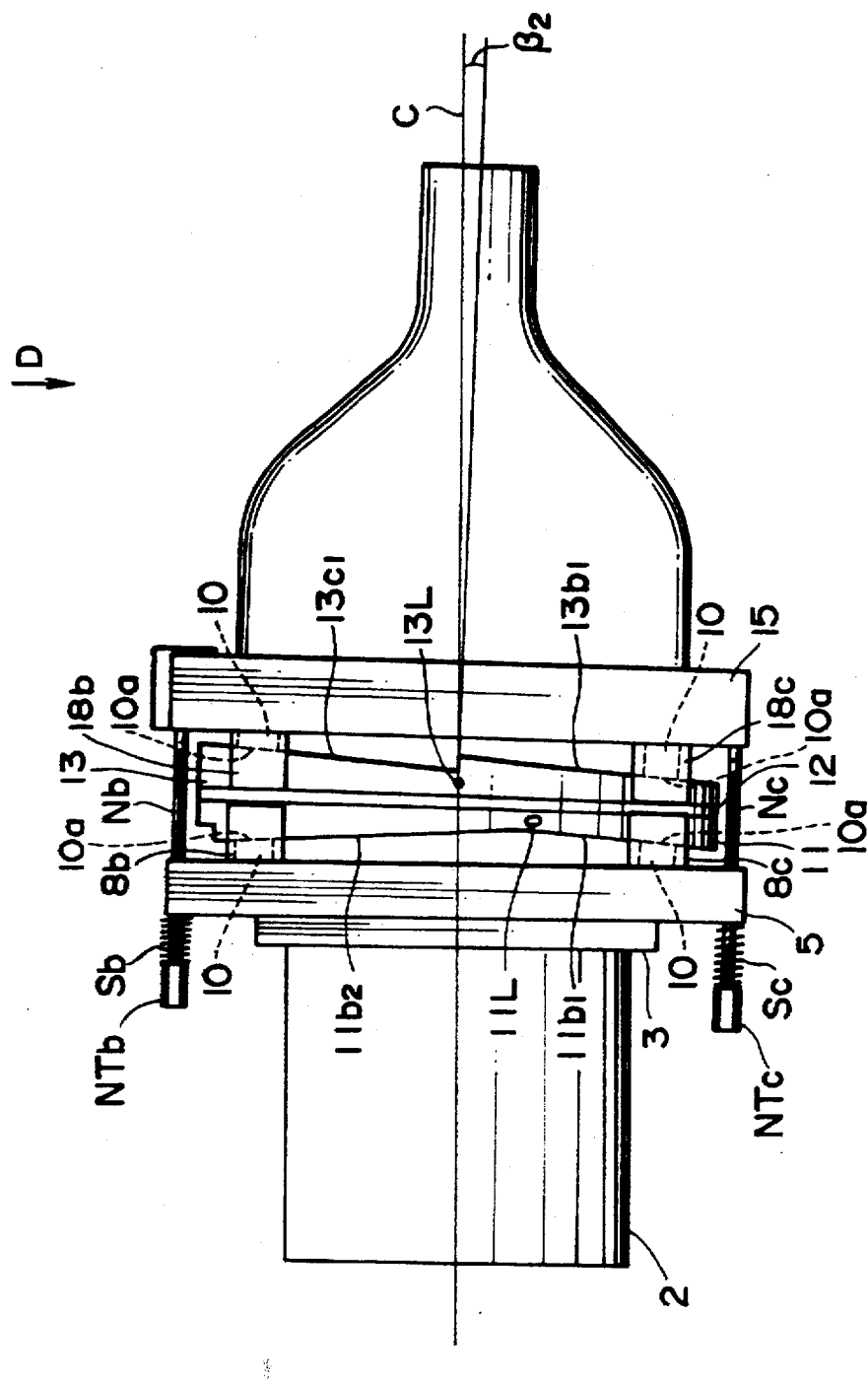
FIG. 8 is a schematic diagram for giving a; vertical tilt angle to a projector apparatus of a preferred embodiment.

Moreover, as shown in FIG. 6D, when the inclined surface of the inclination ring 11 (13) is inclined in the left side, the ring supporting member 10 is also inclined in the left side depending on the inclination of the ring surface. Thereby, the projection 10c deviates in the right side in the hole H.

Next, an example of giving a vertical tilt angle $\beta$ by rotating the inclination ring 11 will be explained.

FIG. 7 shows a condition where the inclination ring 11 is rotated in the direction of arrow mark U, that is, in the upper direction by operating the rotating lever 11L from the condition shown in FIG. 2.

When the inclination ring 11 is operated in the upper direction, each inclined surface of the inclination ring 11 rotates while sliding on the flat surface 10a of the ring supporting member 10 arranged at the internal side of the ring guides 8b, 8c (8a, 8d). Therefore, the thinner part of the inclined surface $11b_2$ is placed in contact with the flat surface 10a of the ring supporting member 10 arranged at the internal side of the ring guide 8b and the upper interval between the lens spacer 5 and CRT spacer 15 becomes narrow.

Meanwhile, the thicker part of the inclined surface $11b_1$ is placed in contact with the flat surface 10a of the ring supporting member 10 arranged at the internal side of the ring guide 8c. Therefore, the lower interval between the lens spacer 5 and CRT spacer 15 becomes wider, thereby giving a vertical tilt angle $\beta_1$ in the upper direction.

On the other hand, the thinner part of the inclined surface $11b_1$ is placed in contact with the flat surface 10a of the ring supporting member 10 arranged at the internal side of the ring guide 8c. Thereby, the upper interval between the lens spacer 5 and CRT spacer 15 becomes wide, giving a vertical tilt angle $\beta_2$ in the upper direction with respect to the center line C.

Next, an example for giving a horizontal swing angle $\theta$ by rotating the inclination ring 13 will be explained.

Figure 9:
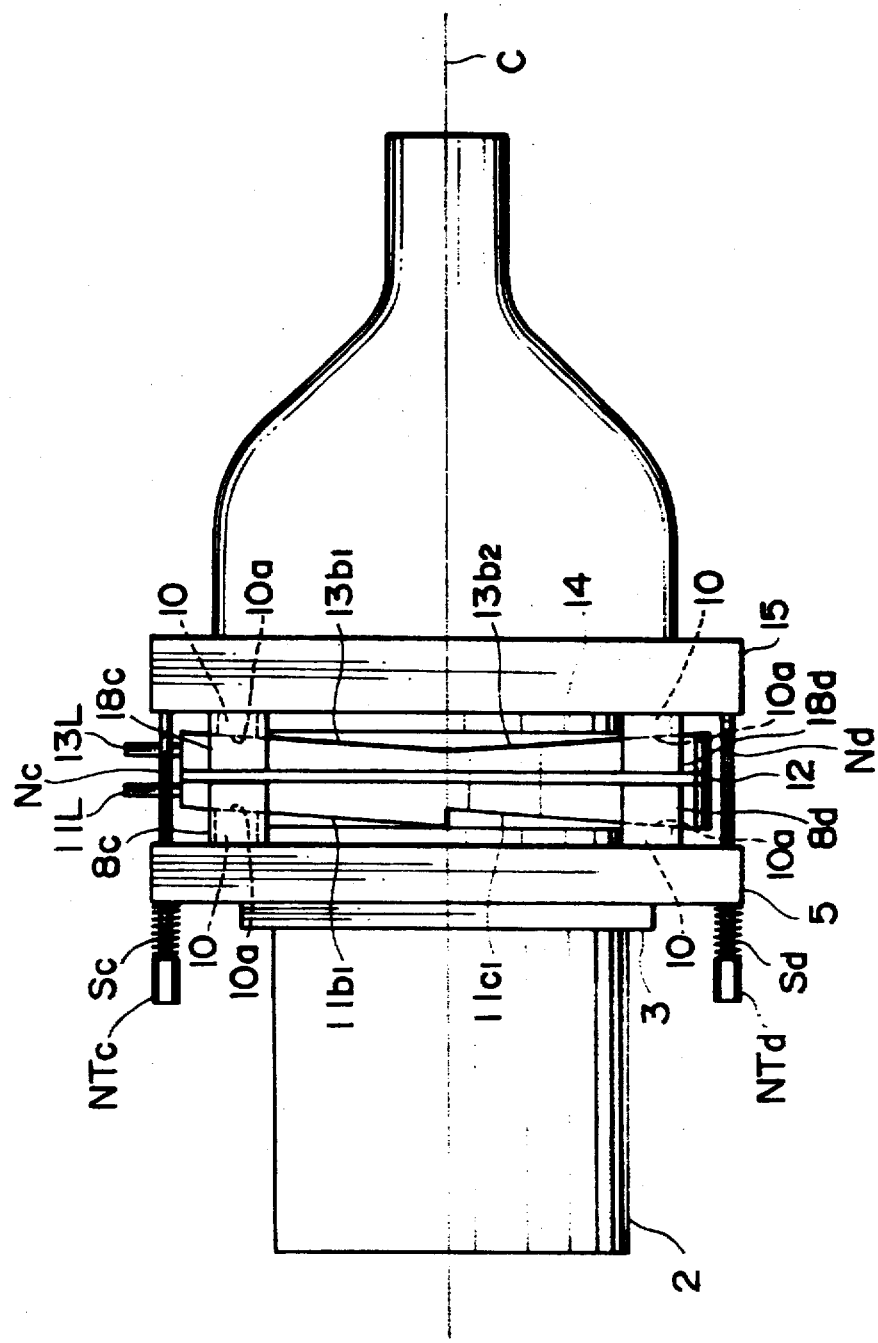
FIG. 9 is a plan view showing a projector apparatus of a preferred embodiment from the lower side.
Figure 10:
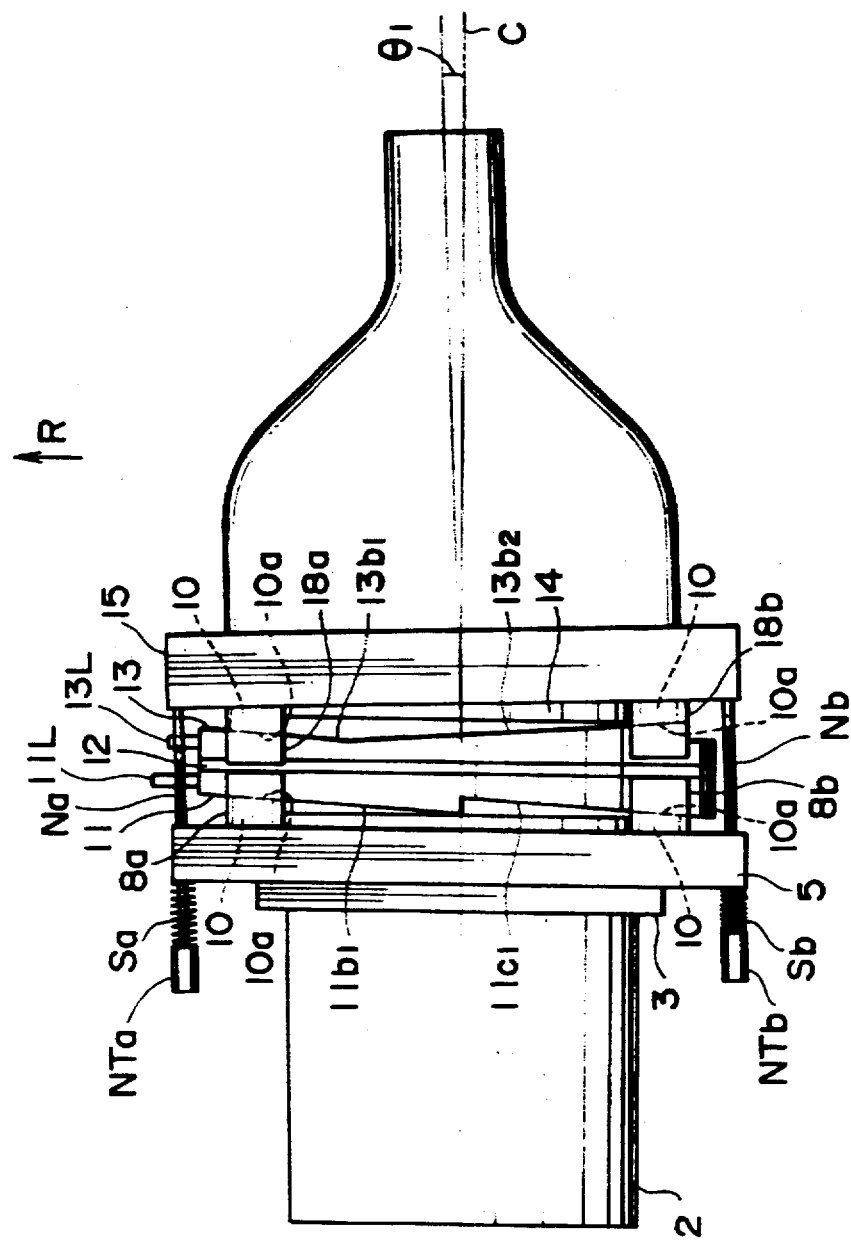
FIG. 10 is a schematic diagram for giving a horizontal swing angle to a projector apparatus of a preferred embodiment.
Figure 11:
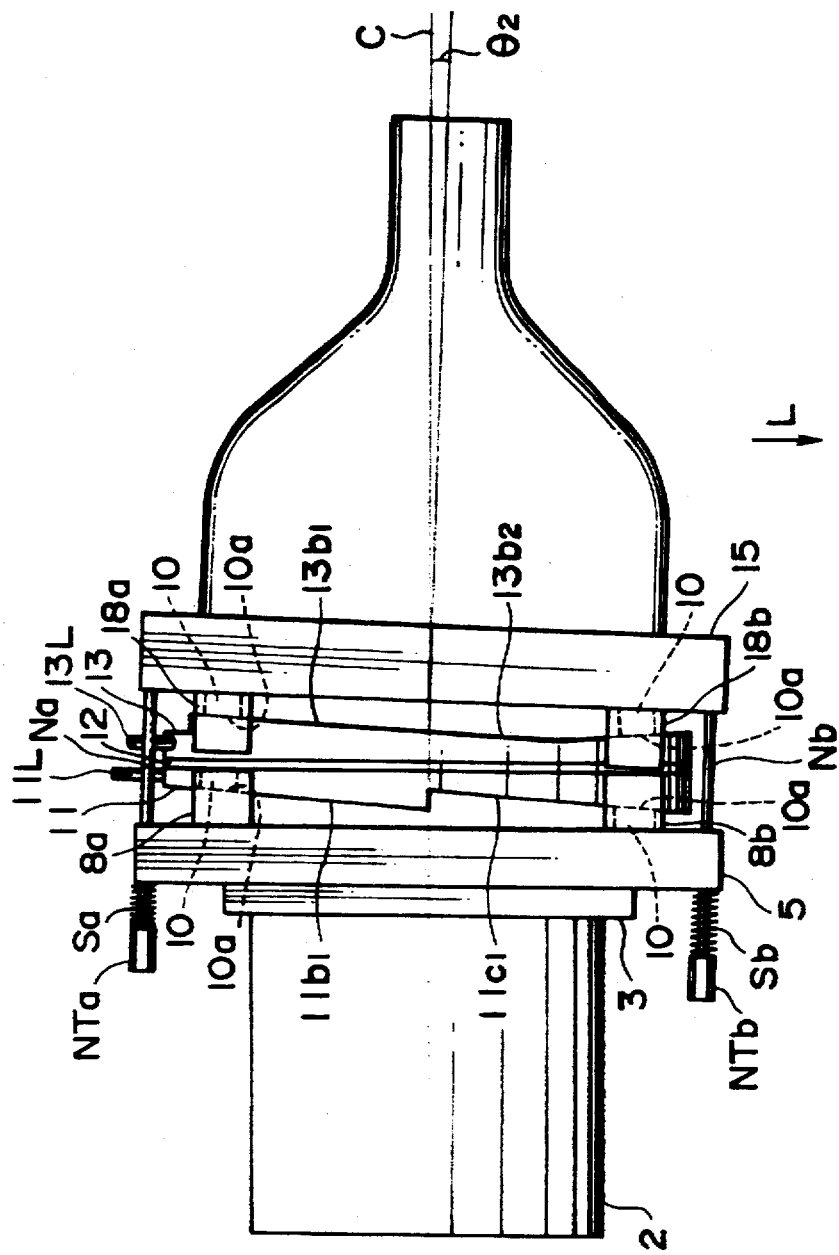
FIG. 11 is a schematic diagram for giving a, horizontal swing angle to a projector apparatus of a preferred embodiment.

FIG. 9, FIG. 10, and FIG. 11 to be explained as the example show the projector apparatus 1 from the lower side. In FIG. 9, no swing and tilt angle is given, namely, the rotating levers 11L, 13L are provided opposed with each other, while in FIG. 10, the right side swing angle is given and in FIG. 11, the left side swing angle is given.

FIG. 10 shows an example where the inclination ring 13 is rotated in the direction of arrow mark R, that is, in the right direction by operating the rotating lever 13L from the condition shown in FIG. 9.

When the inclination ring 13 is operated in the direction of arrow mark R, each inclined surface of the inclination ring 13 rotates sliding on the flat surface 10a of the ring supporting member 10 arranged in the internal side of the ring guides 18c, 18d (18d, 18b). Therefore, the thinner part of the inclined surface 13b, is placed in contact with the flat surface 10a of the ring supporting member 10 arranged in the internal side of the ring guide 18c and the right side (upper side in FIG. 10) interval between the lens spacer 5 and CRT spacer 15 becomes narrow.

On the other hand, the thicker part of the inclined surface $13b_2$ is placed in contact with the flat surface 10a of the ring supporting member 10 arranged in the internal side of the ring guide 18d. Therefore, the left side (lower side of FIG. 10) interval between the lens spacer 5 and CRT spacer 15 becomes wide, giving a horizontal right side swing angle $\theta_1$ with respect to the center line C shown in the figure.

As shown in FIG. 11, when the inclination ring 13 is rotated in the direction of arrow mark L, that is, in the left side direction by operating the rotating lever 13L, the thicker part of the inclined surface $13b_1$ ($11b_1$) is placed in contact with the flat surface 10e of the ring supporting member 10 arranged in the internal side of the ring guide 18c and thereby the right side (upper side of FIG. 11) interval between the lens spacer 5 and CRT spacer 15 becomes wide.

On the other hand, the thicker part of the inclined surface $13b_2$ is placed in contact with the flat surface 10a of the ring supporting member 10 arranged in the internal side of the ring guide 18. Therefore, the left side (lower side of FIG. 11) interval between the lens spacer 5 and CRT spacer 15 becomes narrow, giving a horizontal left side tilt angle $\theta_2$ with respect to the center line C illustrated.

Figure 12:
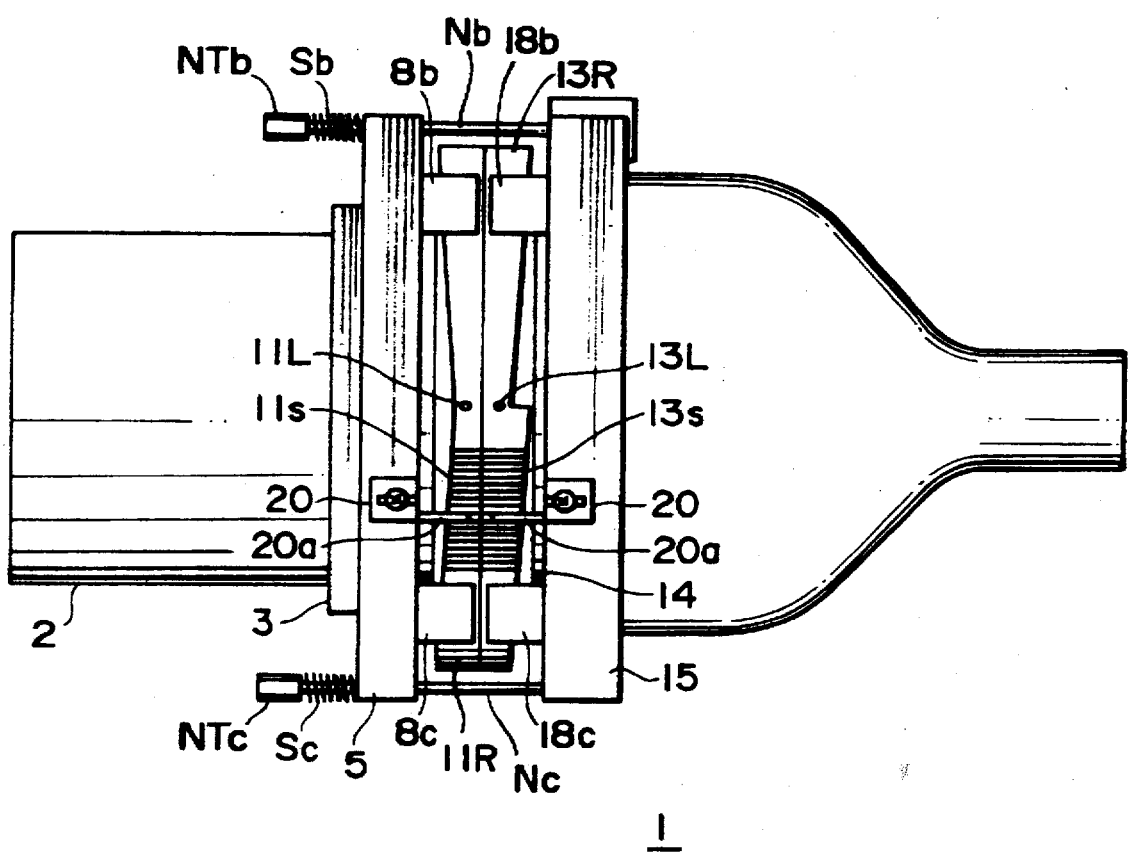
FIG. 12 is a diagram for explaining another embodiment of the present invention.

As the stopper mechanism of the inclination rings 11, 13, as shown in FIG. 12, for example, the inclination rings 11R, 13R having the groove portions 11S, 13S forming a plurality of grooves are used and the stoppers 20, 20 having an engaging portion 20a to be engaged with the groove portions 11S, 13S may be provided to the lens spacer 5 and CRT spacer 15.

Moreover, it is also possible to use the inclination ring 11 arranged in the side of lens spacer 5 for horizontal direction adjustment by changing the arrangement direction of the inclination ring and the inclination ring 13 arranged in the CRT spacer 15 for vertical direction adjustment.

The ring supporting member 10 supporting the inclination rings 11, 13 may also be projected integrally to each spacer as the ring supporting projections.

Next, another embodiment of the present invention will be explained.

Figure 13:
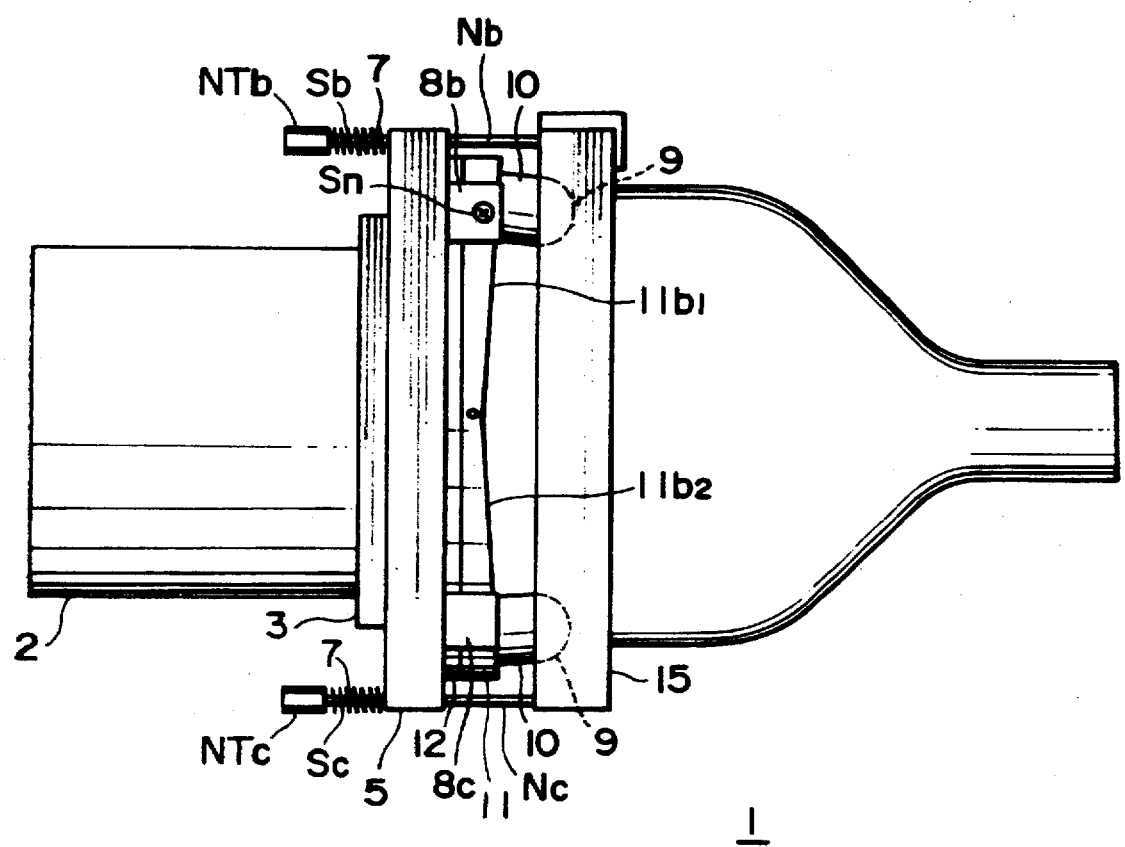
FIG. 13 is a diagram showing an example for providing a stopper mechanism to a side surface of the inclination ring.
Figure 14A:
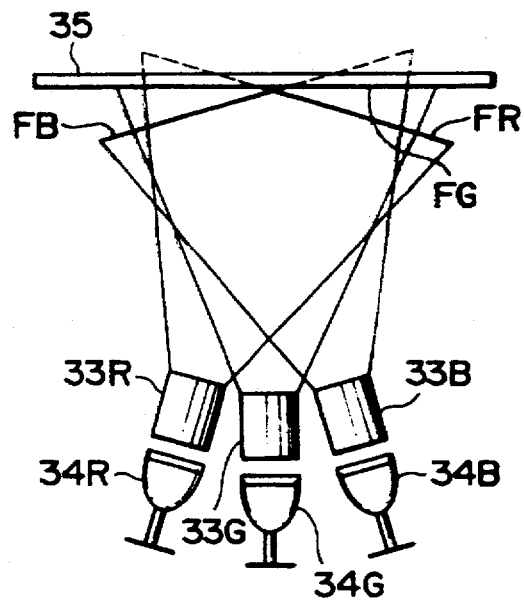
FIGS. 14A and 14B are schematic diagrams showing a focus on the display screen of a projector apparatus.
Figure 14B:
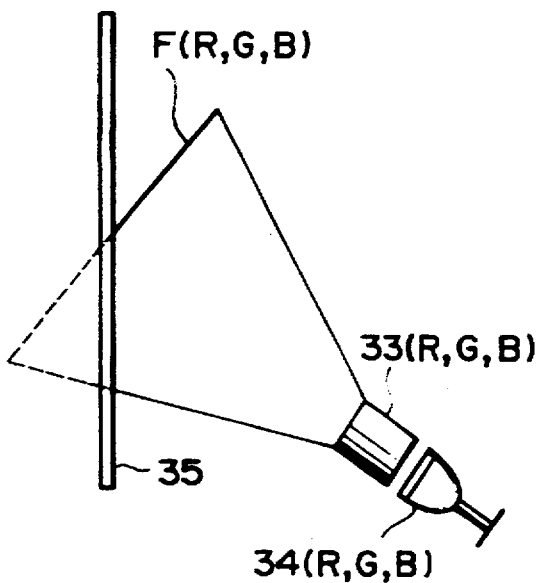
Figure 15A:
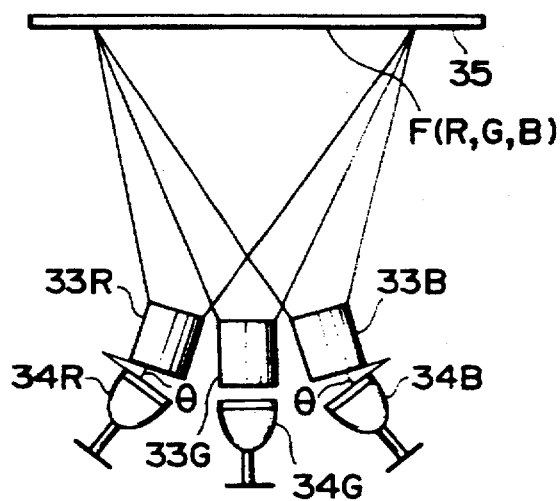
FIGS. 15A and 15B are diagrams for explaining a swing and tilt angle of a projector apparatus.
Figure 15B:
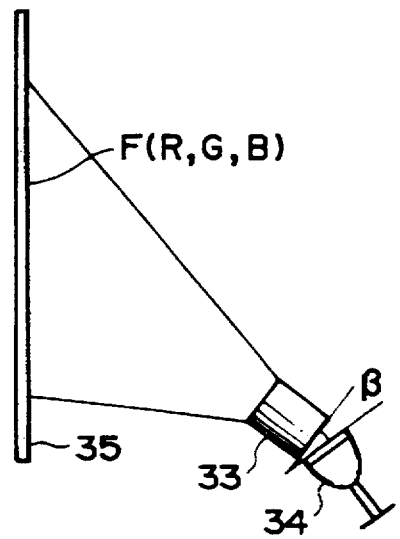
Figure 16A:
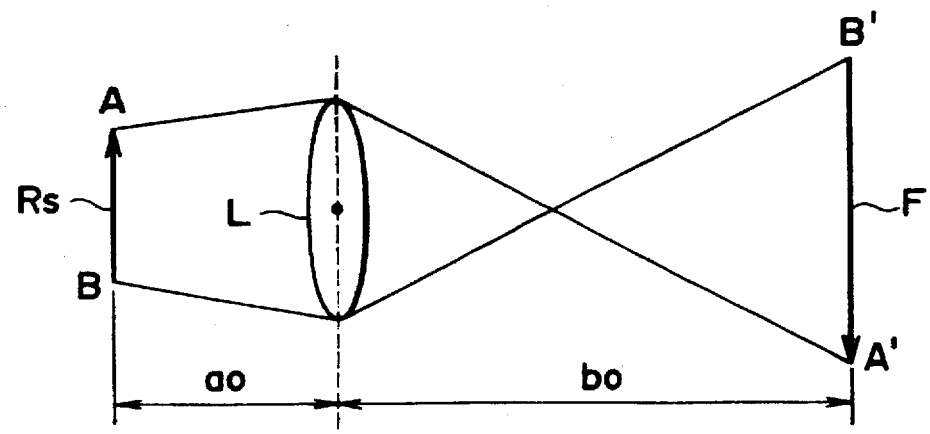
FIG. 16 is a schematic diagram for showing a distance of the focusing surface depending on the lens characteristic.
Figure 16B:
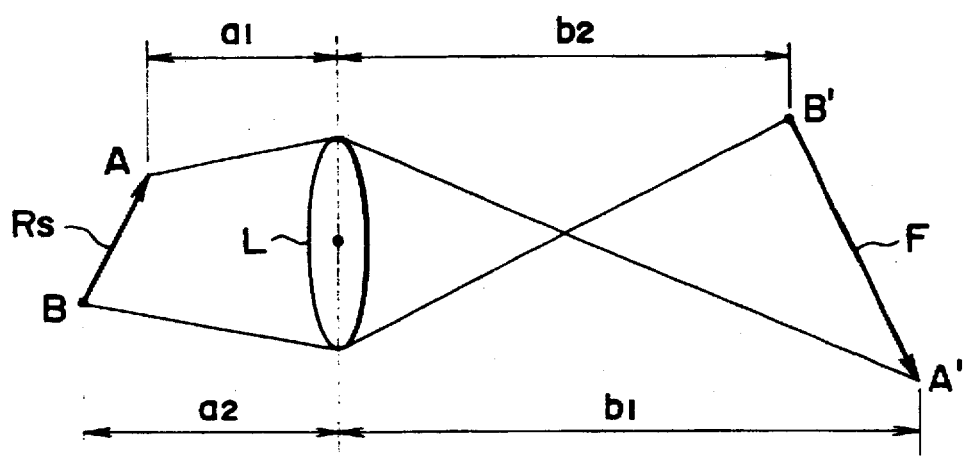
Figure 18:
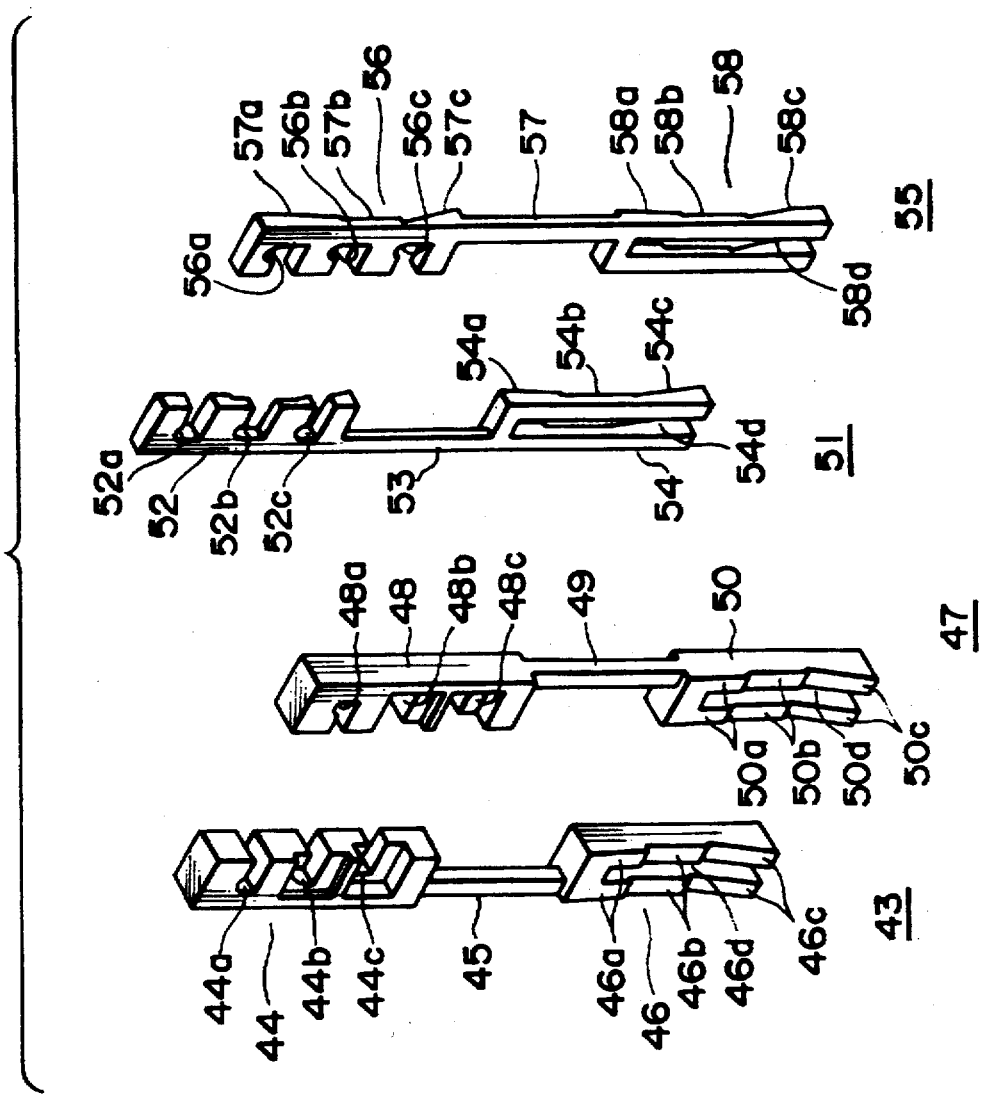
FIG. 18 is a perspective view showing an enlarged spacer of a swing and tilt angle adjusting mechanism shown in FIG. 17.
Figure 20:
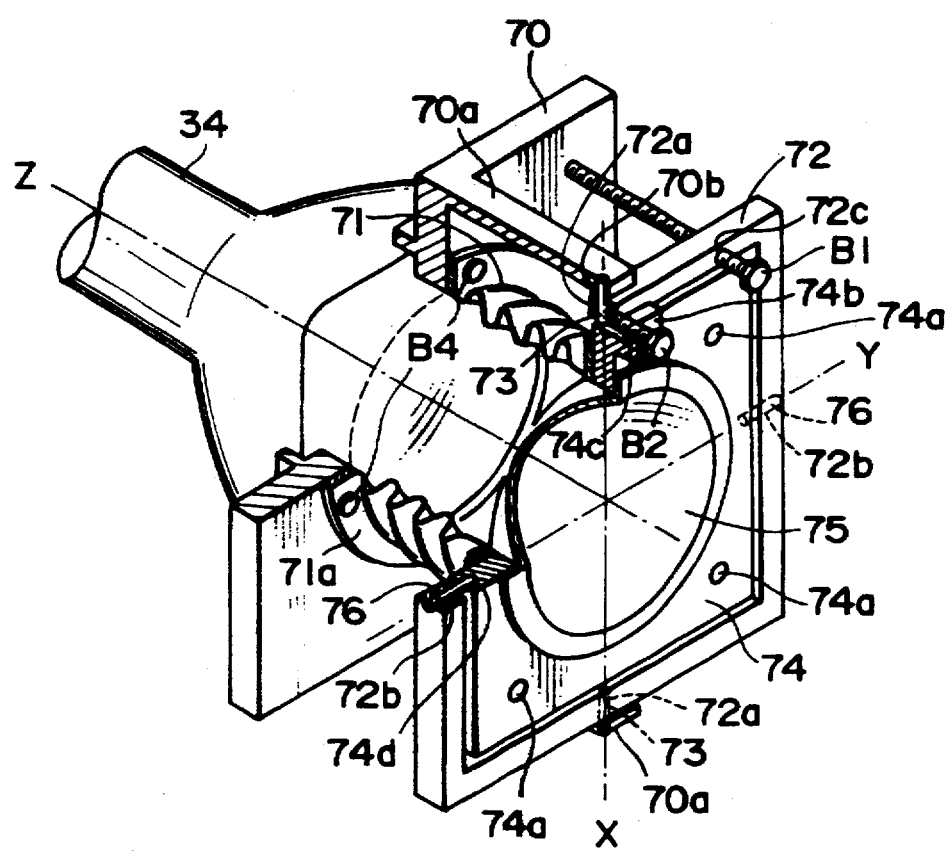
FIG. 20 is a diagram for explaining a swing and tilt adjusting mechanism utilizing 2-axis mechanism as a related art.
Figure 21:
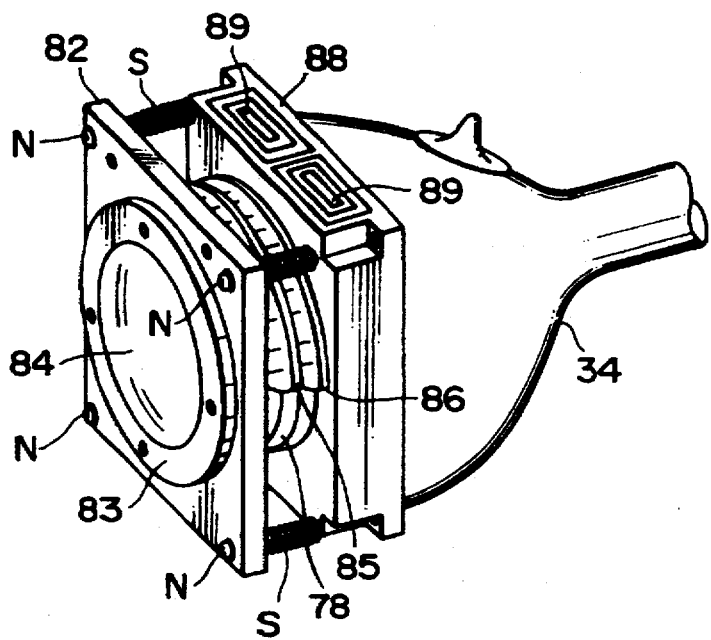
FIG. 21 is a diagram for explaining a swing and tilt adjusting mechanism utilizing an inclination ring as a related art.
Figure 22A:
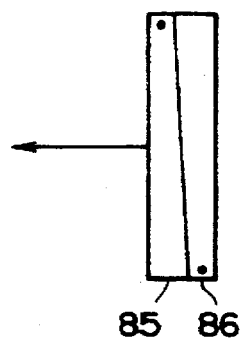
FIGS. 22A–22C are schematic diagrams showing a swing and tilt angle given by the inclination angle shown in FIG. 21.
Figure 22B:
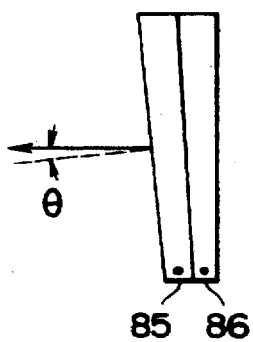
Figure 22C:
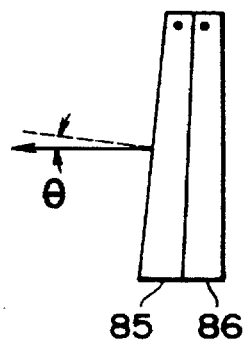

FIG. 13 is a side elevation showing an example of the projector apparatus which can adjust any one of the horizontal/vertical swing or tilt angle using only one inclination ring explained in the above embodiment as the swing and tilt angle adjusting mechanism. In FIG. 13, the elements like those in FIG. 2 are designated by the like reference numeral.

In the other embodiment, the lubricating ring 12 and inclination ring 11 are arranged in the side of the lens spacer 5 and the inclination ring supporting member 10 for supporting the inclination ring 11 is arranged in the side of the CRT spacer 15.

The guide groove (not illustrated) to which any one of the guide projection 12a or 12b of the lubricating ring 12 is inserted is formed to the lens spacer 5 and the other guide projection 12a or 12b of the lubricating ring 12 is engaged with the inclination ring 11.

Moreover, a spot facing 9 (indicated by a broken line) to which a ring supporting member 10 to be in contact with the inclined surfaces $11b_1$, $11b_2$ ($11a_1$, $11a_2$) of the inclination ring 11 is arranged is formed on the CRT spacer 15. The operation for providing a swing and tilt angle when the inclination ring supporting member 10 slides, on the inclined surfaces $11b_1$, $11b_2$ ($11a_1$, $11a_2$) of the inclination ring 11 is similar to that of the embodiment explained with reference to FIG. 9, FIG. 10 and FIG. 11. Therefore, detailed explanation of such operation is omitted here.

As explained, the swing and tilt angle adjusting mechanism using only one inclination ring 11 can save the installation space as much as one inclination ring and can adjust, for example, the vertical tilt angle when the inclination ring 11 is rotated by operating the rotating lever 11L (upper direction or lower direction).

For example, the arrangement space is restricted in some cases defending on a kind (size, etc.) of projection lens to be used, but the coarse/fine adjustment of the vertical tilt angle, for example, can be done only with a narrow space by using a swing and tilt angle adjusting mechanism indicated as the other embodiment of the present invention.

In this case, in regard to the horizontal swing angle, it is enough to previously give the horizontal swing angle using an exclusive spacer or the like.

Here, an example of giving a vertical tilt angle with the inclination ring 11 has been explained and it is also possible to form a swing angle adjusting mechanism for adjusting only the horizontal swing angle by arranging such inclination ring 11 with deviation, for example, of 90 degrees.

Moreover, the spot facing 9 of the inclination ring supporting member 10 may be formed in the side of the lens spacer 5 by arranging the inclination ring 11 in the side of the CRT spacer 15.

In addition, like the embodiment explained above, the inclination ring supporting member 10 may be formed integrally as the projection on the lens spacer or CRT spacer 15. It is also possible to form the groove at the side surface of the inclination ring 11 to provide the stopper mechanism as shown in FIG. 12.

As explained previously, the present invention easily enables stable and fine adjusting operation because the swing and tilt angle can be changed within the same plane by rotating the inclination ring. In addition, the present invention is also suitable for the coarse adjustment because the adjusting condition can be detected quantitatively from the rotating angle of the inclination ring.

Furthermore, the swing and tilt angle adjusting mechanism can be formed with fewer elements than those used in the related art and the assembling does not require any particular jig, providing the merit that the fabrication cost can be lowered.

Although preferred embodiments of the present invention have been described and illustrated, it will be apparent to those skilled in the art that various modifications may be made without departing from the principles of the invention.

What is claimed is:

1. A projector apparatus comprising:

a cathode ray tube;

a lens block forming an image focusing optical system; and a swing and tilt angle adjusting mechanism arranged between said cathode ray tube and said lens block to give a predetermined swing and tilt angle to said cathode ray tube, said swing and tilt angle adjusting mechanism including:

an inclination ring formed symmetrically with respect to a center line of an aperture of said lens block and provided with at least two inclined surfaces of a predetermined inclination angle on both sides of said center line;

an inclination ring supporting member for supporting the inclined surfaces of said inclination ring; and a ring guide for assisting rotation of said inclination ring, whereby the swing and tilt angle can be adjusted when said inclination ring supporting member slides on the inclined surface of said inclination ring.

2. The projection apparatus as set forth in claim 1, wherein a flat surface area of said inclination ring is provided for holding said lens block via a buffer material.

3. The projector apparatus as set forth in claim 1, wherein said inclination ring supporting member is mounted to be deviated depending on an inclination of the inclined surface of said inclination ring.

4. The projector apparatus as set forth in claim 1, wherein said inclination ring supporting member is formed as a spacer for holding one of said cathode ray tube or said lens block.

5. The projector apparatus as set forth in claim 1, wherein said ring guide comprises a stopper mechanism for preventing said inclination ring from rotating.

6. The projector apparatus as set forth in claim 1, further comprising a stopper mechanism having a plurality of grooves formed at a side surface of said inclination ring and a stopper engaged with said grooves for preventing said inclination ring from rotating.

7. A projector apparatus comprising:

a cathode ray tube;

a lens block forming an image focusing optical system;

a swing and tilt angle adjusting mechanism provided between said cathode ray tube and said lens block to provide a predetermined swing and tilt angle to said cathode ray tube, wherein said swing and tilt angle adjusting mechanism includes:

first and second inclination rings formed symmetrically with respect to a center line of an aperture of said lens block and provided on one surface with at least two continuous inclined surfaces of a predetermined inclination angle on both sides of said center line;

inclination ring supporting members for supporting the inclined surfaces of said first and second inclination rings; and ring guides for assisting rotation of said first and second inclination rings, whereby said first and second inclination rings are arranged so that other surfaces where the inclined surfaces are not formed are provided to be opposed with each other.

8. The projector apparatus as set forth in claim 7, further comprising a buffer member arranged between said first and second inclination rings.

9. The projector apparatus as set forth in claim 7, wherein said inclination ring supporting member is mounted to be deviated depending on the inclination angle of the inclined surfaces of said first and second inclination rings.

10. The projector apparatus as set forth in claim 7, wherein said inclination ring supporting member is formed as a spacer for holding one of said cathode ray tube or said lens block.

11. The projector apparatus as set forth in claim 7, wherein said ring guide includes a stopper mechanism for preventing rotation of said first and second inclination rings.

12. The projector apparatus as set forth in claim 7, further comprising a stopper mechanism including a plurality of grooves formed at respective side surfaces of said first and second inclination rings and a stopper for engaging said grooves and preventing said inclination ring from rotating.

* * * * *